(12) United States Patent
Benbrahim

(10) Patent No.: US 8,493,720 B2
(45) Date of Patent: Jul. 23, 2013

(54) QUICK MOUNTING SYSTEM AND MEDIA WITH COMPATIBILITY AND ACCESS CONTROL

(76) Inventor: Jamal Benbrahim, Reno, NV (US)

( * ) Notice: Subject to any disclaimer, the term of this patent is extended or adjusted under 35 U.S.C. 154(b) by 110 days.

(21) Appl. No.: 13/274,264

(22) Filed: Oct. 14, 2011

(65) Prior Publication Data

US 2012/0033947 A1     Feb. 9, 2012

Related U.S. Application Data

(63) Continuation-in-part of application No. 12/717,849, filed on Mar. 4, 2010, now Pat. No. 8,213,164.

(51) Int. Cl.
*H05K 5/00* (2006.01)
*H05K 7/00* (2006.01)
*G06F 1/16* (2006.01)

(52) U.S. Cl.
USPC ............. 361/679.02; 361/679.01; 361/679.31

(58) Field of Classification Search
USPC ........................... 361/679.01, 679.02, 679.31
See application file for complete search history.

(56) References Cited

U.S. PATENT DOCUMENTS

| 5,969,953 | A | 10/1999 | Purdom et al. | |
| 6,567,273 | B1 * | 5/2003 | Liu et al. | 361/737 |
| 6,706,966 | B2 * | 3/2004 | Browning et al. | 174/542 |
| 6,979,210 | B2 * | 12/2005 | Regen et al. | 439/131 |
| 7,125,265 | B2 * | 10/2006 | Weng | 439/131 |

* cited by examiner

*Primary Examiner* — Anthony Haughton
(74) *Attorney, Agent, or Firm* — Weide & Miller, Ltd.

(57) ABSTRACT

Functionality and control of the media module using a method and apparatus for access and compatibility control is disclosed. The media module interfaces with a camera or other device to store image and audio data from the camera on memory. Access to the media module is controlled by method and system for data encryption or authentication. Encryption or authentication controls access and compatibility with particular camera, camera line, or camera manufacture. The encryption or authentication may also control access to features or functions of the media module. An authentication module comprising an input/output controller, processor and memory processes an authentication request or command to determine if the media module and camera are compatible. The processor may execute software stored on the memory to perform any type of authentication including a hash operation, symmetric key operation, or asymmetric key operation.

19 Claims, 15 Drawing Sheets

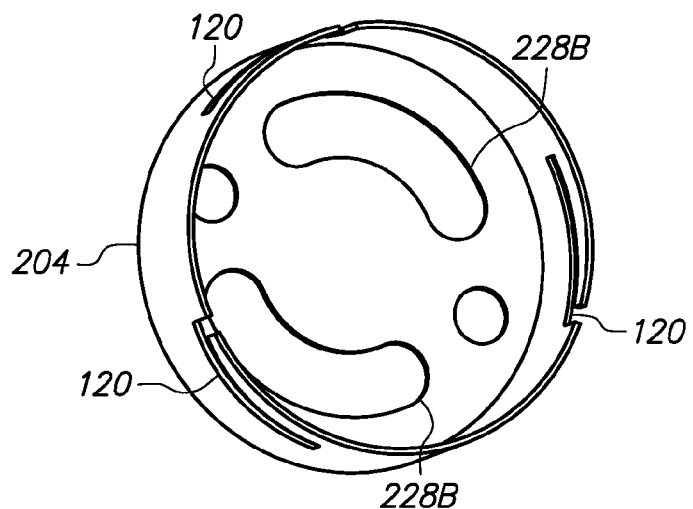
FIG. 2B
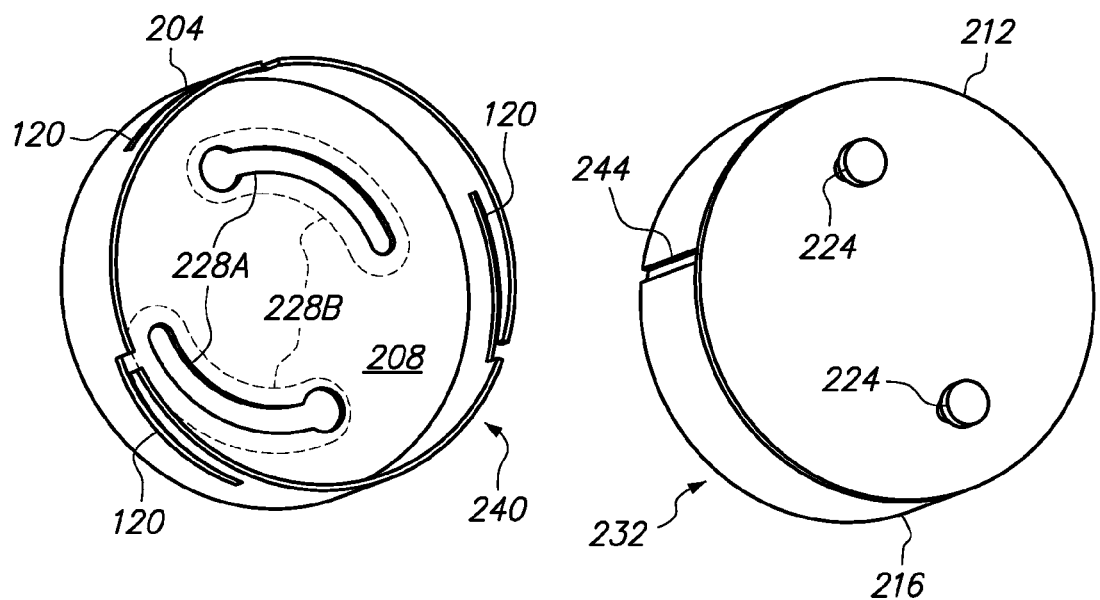
FIG. 2C  FIG. 2D

US 8,493,720 B2

QUICK MOUNTING SYSTEM AND MEDIA WITH COMPATIBILITY AND ACCESS CONTROL

PRIORITY CLAIM

This application claims priority to and is a continuation in part of U.S. patent application Ser. No. 12/717,849 entitled QUICK MOUNTING SYSTEM AND MEDIA FOR VIDEO RECORDING filed on Mar. 4, 2010 now U.S. Pat. No. 8,213,164.

BACKGROUND OF THE INVENTION

1. Field of the Invention

The invention relates to storage media, particularly to a quick mounting system and media for video and other recordings.

2. Related Art

Historically, the television and film industry has relied on chemical film to record motion pictures and other videos recordings. This process has a number of disadvantages in that it requires the use of chemical processing which introduces delays between the time footage is recorded and the time the footage may be reviewed. It is also costly to purchase the file media itself and the post processing is expensive and time consuming. In recent years, the industry has moved away from chemical film and started utilizing digital media to record video footage to reduce the time between recoding and reviewing of footage and to realize other benefits.

In both chemical film and digital media, large volumes of media are used during filming. Even in digital media, the volume of media consumed may be so large that in some cases that attempts have been made to record motion pictures on remote storage devices. This requires a video camera to be tethered to a storage device by one or more data transmission cables. As can be appreciated, this arrangement is cumbersome to the camera man and even with high speed connections, the transfer of digital data from one device to another consumes a substantial amount of time.

While some attempts have been made to utilize digital media contained within a camera, such attempts have been unsuccessful except perhaps in simple consumer applications. In addition to such cameras not containing enough media, the transfer process from the media to post processing is too slow and would prevent use of the camera during the transfer.

From the discussion that follows, it will become apparent that the present invention addresses the deficiencies associated with the prior art while providing numerous additional advantages and benefits not contemplated or possible with prior art constructions.

SUMMARY OF THE INVENTION

A mounting system for rapidly mounting and dismounting storage media to various devices, such as video equipment, is disclosed herein. The mounting system allows data files, even large data files, to be quickly moved from one device to another while generally avoiding the time-consuming task of electronically transferring data between devices. The mounting system also allows storage media to be rapidly mounted to a single device. For example, a user may rapidly replace storage media for a video camera as the storage media is filled or otherwise used.

The mounting system for storage media may have a variety of configurations. In one exemplary embodiment, the mounting system may comprise a storage media having one or more connectors and configured to store data, an enclosure comprising one or more media guides for storing the storage media, and a cap comprising one or more locking guides and an open portion configured to accept at least a portion of the enclosure. The cap will typically be rotatably mounted to the enclosure. It is noted that the enclosure may comprise one or more openings to allow the one or more connectors or one or more device connectors to pass therethrough The media guides may be configured to engage one or more pins to align the connector of the storage media with the device connector. The locking guides may be configured to engage the pins to mount the enclosure to a device. The locking guides may comprise a first portion and a second portion. The first portion may be configured to align with at least a portion of the media guides. The second portion may be angled relative to the first portion, or the second portion may be curved to allow the cap to secure the enclosure to a base or a device. The one or more media guides may be straight to guide the storage media's connector to properly connect with the device connector.

A base configured to accept at least a portion of the cap may be provided as well. It is noted that the device connector may be located at the base. In addition, the one or more pins may extend from a portion of the base. In this manner, rotating the cap mounts the enclosure to the base via the pins of the base and the locking guides of the cap. It is noted that the cap may be cylindrical in shape.

A connecting plate attached to an interior portion of the cap may be provided, to rotatably mount the cap to the enclosure. The connecting plate may comprise one or more curved channels. The enclosure may comprise one or more connecting pins which engage the curved channels. The one or more curved guides may then guide the rotation of the cap relative to the enclosure. In this manner, the one or more curved channels may engage the one or more connecting pins to rotatably mount the cap to the enclosure.

In another exemplary embodiment, the mounting system for storage media may comprise an enclosure configured to store a storage media, and one or more media guides on an outer surface of the enclosure. The one or more media guides may be configured to align a connector of the storage media with a device connector, and to guide the connector to the device connector to form a communication connection between the connector and the device connector. The media guides may be straight.

The mounting system may also comprise a cap having an open portion to accept the enclosure, and one or more locking guides. The one or more locking guides may have a first portion configured to align with the one or more media guides and a second portion configured to secure the enclosure to a base. The second portion of the one or more locking guides may be angled relative to the first portion of the one or more locking guides. A mount between the cap and the enclosure may also be provided. The connecting mount may be configured to rotatably mount the cap to the enclosure, with the enclosure being mounted within the open portion of the cap.

A base may be provided in as well. For example, the mounting system may comprise a base comprising a coupler having one or more pins extending therefrom. The coupler may be configured to accept at least a portion of the cap and the enclosure. The pins of the coupler may be configured to engage the media guides to align and guide the connector to the device connector, and to engage the locking guides to mount the enclosure to the base. The base may be included in or be part of various devices. For example, the base may be part of video equipment, such as cameras, computers, editing stations, media readers, video projectors, and display screens. It is noted that the base may be configured to store or hold a media module to another structure. For example, at least one base may be attached to a harness, such as a belt or the like, configured to be worn by a user.

An exemplary method of mounting a storage media to an electronic device is disclosed herein as well. In one embodiment, the method may comprise aligning one or more media guides of an enclosure of a media module with one or more pins of a base, aligning at least a portion of one or more locking guides of a cap of the media module with the pins of the base, and inserting at least a portion of the cap into a portion of the base. A first portion of the locking guides and the media guides may engage the pins during insertion.

The cap may be rotated in a first direction to move the pins into a second portion of the locking guides to mount the enclosure to the base. In general, the cap may be rotated relative to the base and the enclosure. The enclosure may be guided into the base by the media guides. In this manner, a connector of the enclosure may be guided to a device connector of the base to form a communication connection between the connector and the device connector.

It is noted that rotating the cap in the first direction may comprise moving the one or more pins into an angled second portion of the one or more locking guides. Alternatively or in addition, rotating the cap in the first direction may comprise moving the one or more pins into a curved second portion of the one or more locking guides.

The method may include a method for dismounting the storage media from the electronic device. Dismounting the storage media may comprise rotating the cap in a second direction to move the pins out of the second portion of the locking guides, and removing the one or more pins from the locking guides and the media guides. Typically, the second direction will be opposite of that of the first direction.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 2B is a bottom perspective view of an exemplary cap;

FIG. 2C is a bottom perspective view of an exemplary cap and connecting plate;

FIG. 2D is a perspective view of an exemplary cover;

DETAILED DESCRIPTION OF THE PREFERRED EMBODIMENTS

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the storage media and mounting system herein utilize solid-state media, such as flash memory, to record data. Of course, other types of storage media may be used with the mounting system, such as disks, RAM drives, solid state disks (SSDs), memory modules and the like, or another type of memory developed in the future. Though described herein as recording or storing video, it will be understood that a variety of data may be stored for later access on the storage media and mounting system. The mounting system may be used by professional and non-professional users.

In one or more embodiments, the mounting system provides the benefit of improving the way storage media is mounted to various devices and used by such devices. As will be described further below, the mounting system may be configured to allow quick and easy removal/replacement of storage media, locking of media to prevent changes to the data thereon, and high performance storage and retrieval of video, among other things.

The mounting system may be used with a variety of electronic devices that may read, write, or otherwise access electronically stored data. As will be described further below, the mounting system may be used by video equipment/devices, such as video recording, editing, and other video production equipment.

Traditionally, video has been recorded on tape media, magnetic media, and flash media. These traditional media must be swapped or their data transferred to another storage medium frequently, especially in movie and film production, because of the enormous quantity of footage being recorded. For example, during a video shoot, 700 Gigabytes of data storage may be required to record 1 hour of video. This is a problem because swapping of media and data transfers take time to complete. Indeed, this is highly undesirable because it renders a camera (or other video recording device) unusable thus extending shooting times thus leading to increased costs for movie and film productions.

At some point even the largest capacity storage media will become full. Thus, the mounting system herein is highly advantageous in that it reduces the time it takes to remove/replace storage media. This is especially the case where a camera or other video recording device is capturing a live event. Where the event is not live, this is advantageous in that it reduces camera or video recording downtime.

Figure 1:
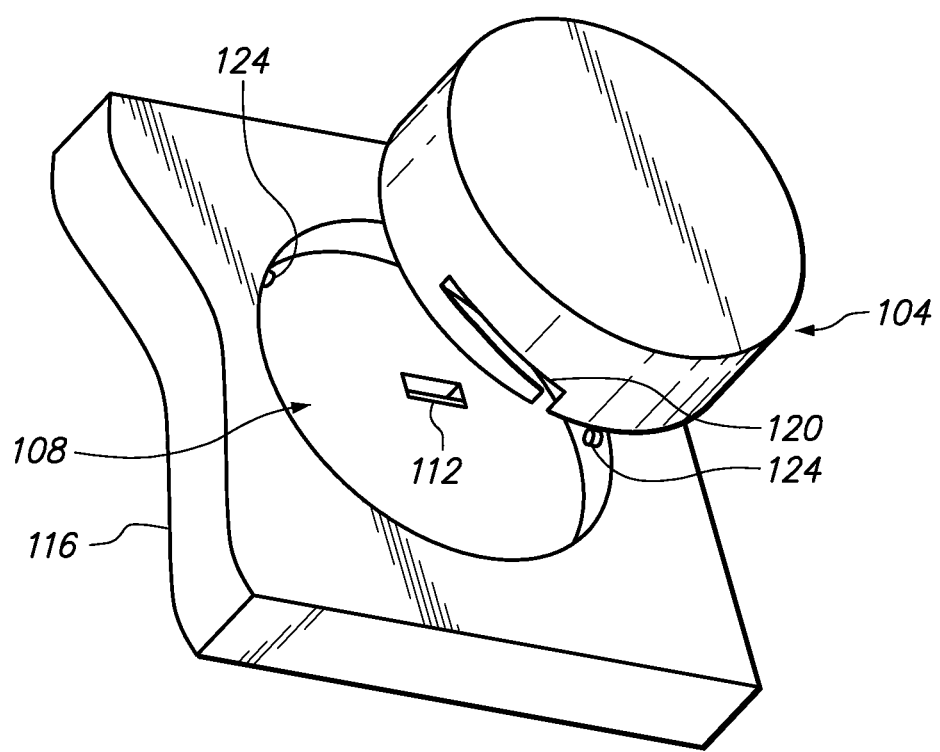
FIG. 1 is a perspective view of an exemplary mounting system.

The mounting system will now be described with regard to FIG. 1. FIG. 1 is a perspective view of an exemplary mounting system comprising a removable media module 104 and a base 116 to which the media module may be mounted. The base 116 may comprise a coupler 108 to accept the media module 104. The base 116 is shown generically here as it may be part of a camera, editing device, playback device, display device (e.g., a video screen/projector), storage device, external media reader, or any other device configured to access or otherwise use data storage.

An electrical connector 112 may be associated with the base 116, such as shown in FIG. 1, to send/receive data to/from the media module 104. In general, the electrical connector 112 will be a connector or port of the device utilizing the media module 104. As will be discussed below, the base 116 may be part of or attached to various devices that can use the media module 104. Any type electrical or optical connector may be adopted for use and as such, the electrical connector should be considered broadly as a device connector 112.

The base 116, media module 104, or both may be configured to allow rapid mounting and removal of recordable media to and from various devices. For example, storage media may be quickly installed for use by a video camera, other recording equipment, editing equipment, viewing equipment, or the like. This also allows storage media to be quickly swapped which provides the advantage of continuous or near continuous recording/filming.

As will be described further below, the base 116, media module 104, or both may include one or more pins, guides, channels, and/or other like structures to allow a connection with the electrical connector 112 to be made quickly and easily. For example, in FIG. 1, the base 116 comprises a coupler 108 comprising an indented portion which is configured to accept at least a portion of the media module 104. As can be seen, the shape of the indent helps align and guide the media module 104 as it is installed. In one or more embodiments, the coupler 108 may be circular or round to allow rotation of at least a portion of the media module 104, as will be described further below.

The embodiment of FIG. 1 also illustrates elements of the base 116 and media module 104 that may be used to align or otherwise guide the media module 104 to properly connect with the device connector 112. For example, the base 116 may have a coupler 108 comprising one or more pins 124. As will be described further below, the pins 124 may work in conjunction with various guides, such as locking guides 120, of the media module 104. The guides may be configured such that the media module 104 must be at one or more particular orientations, i.e. keyed, to be inserted or mounted to a base 116. It will be understood that in some embodiments, an alternate configuration may be used where the pins 124 extend from the media module 104 and the guides are formed into the coupler 108 or base 116.

At least one of the guides 120 may be configured to secure or mount the media module 104 to a base 116. In one embodiment, three guides 120 secure the mount to the media module. To illustrate, the locking guides 120 of the media module 120 may have an open end which accepts the one or more pins 124 when the media module 120 is properly aligned with the coupler 108 or base 116. The locking guides 120 may be various shapes. The locking guides 120 may include various bends, angles, notches and/or curves and the like such as shown in FIG. 1. For example, a first portion of a locking guide 120 may be angled or curved relative to a second portion of the locking guide. In this manner, when rotated, the locking guides 120 and pins 124 secure the media module 104 tightly to the base 116, as will be discussed further below. This is beneficial in ensuring the media module 104 is held securely and ensuring that a proper communications connection with the device connector 112 is made and maintained.

Though shown as passing through a wall of the media module 104, it is noted that one or more locking guides 120 may be formed as grooves on the surface of a media module which do not pass the surface of the media module. These grooved locking guides 120 may be used to guide the media module as it is secured to the base 116.

It will be understood that a variety of device connectors 112 may be used in the mounting system. This includes electrical and optical connectors. It is contemplated that a device connector 112 may be configured to accept physical connections and/or wireless connections. For example, the device connector 112 may be configured to accept a physical electrical or optical connector. As another example, the device connector 112 may be configured to accept an infrared, radio frequency, or other wireless connection.

The benefits of the mounting system apply to both physical and wireless connections. As stated, the mounting system helps align the media module 104 for a proper and secure connection to the device connector 112. The mounting structure may also do the same for wireless connections. For example, an infrared or optical connection may require alignment between the device connector 112 and the media module 104. Equipping the device with an optical or infrared connection reduces or eliminates the electrical contacts that can wear out or break. The guide structures, such as those described above and herein, may be used to ensure that there is proper alignment.

Figure 2A:
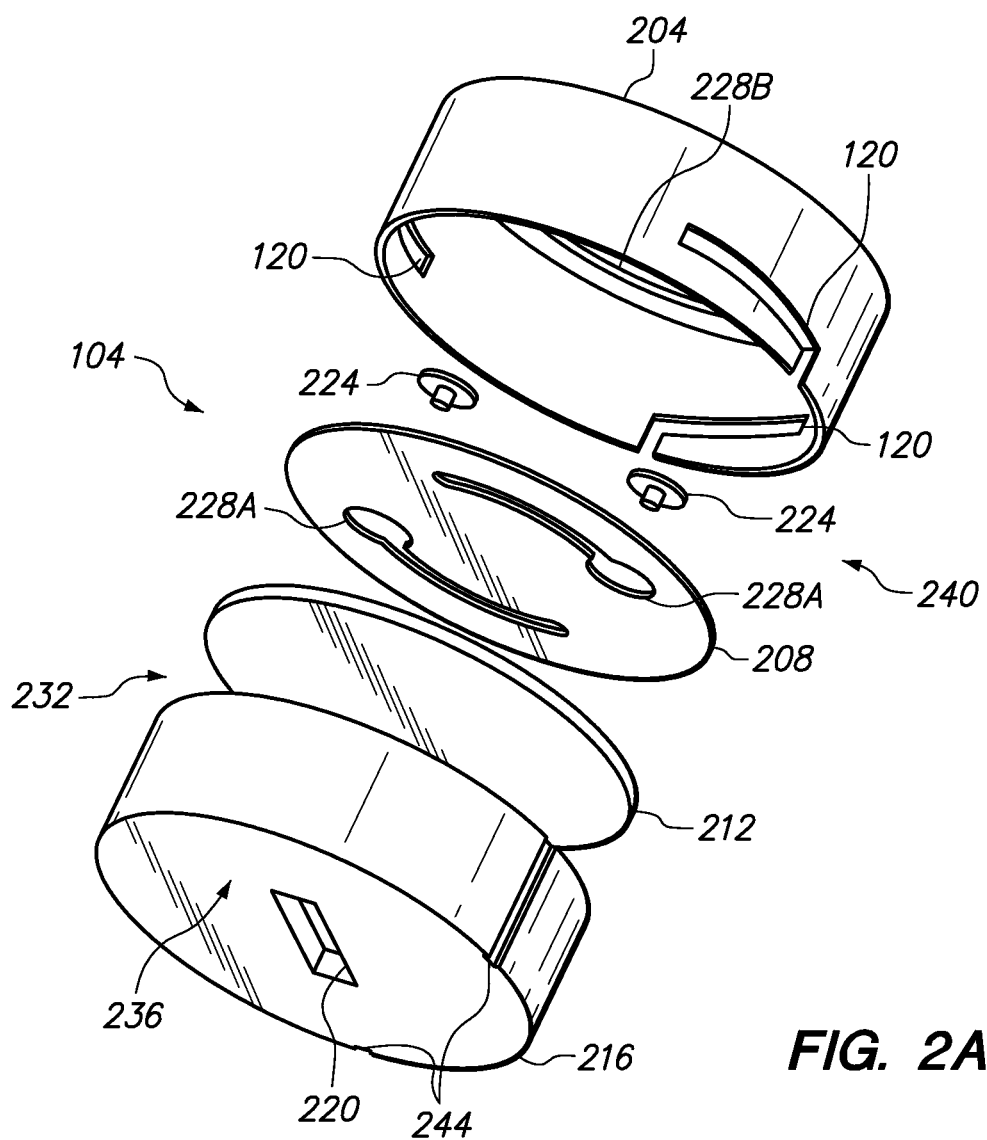
FIG. 2A is an exploded perspective view of an exemplary media module.

The media module will now be further described with regard to FIGS. 2A-2B. In general, the media module 104 is configured to enclose or otherwise store a storage media 236, such as within an enclosure 216. It is noted that the storage media 236 may comprise associated hardware which may also be housed or stored in the media module 104 as will be described further below.

The media module 104 may have various elements which store or secure the storage media 236 and/or associated hardware as well as elements which aid in quick installation and removal of the media module 104 from a coupler or base. In addition, the media module 104 may have elements which ensure the storage media 236 properly connects to or interfaces with a device connector.

In one or more embodiments, the media module 104 may include one or more rotating elements, which twist or turn to secure the media module to a coupler. Other portion(s) of the media module 104 may remain stationary to allow the storage media 236 to remain properly connected to a device connector even as rotating elements of the media module are rotated or otherwise moved to secure or release the media module to or from a coupler.

Referring to FIG. 2A, it can be seen that the media module 104 may comprise a media assembly 232 and a locking assembly 240. In general, the media assembly 232 is configured to store or house storage media 236 and any associated hardware. For example, the media assembly 232 may house flash or other memory in some embodiments. The media assembly 232 may house or support the storage media 236 therein and be configured as an enclosure to protect or cover the media. In general, the locking assembly 240 is configured to secure the media module 104 to a base or coupler, as will be described further below.

In one or more embodiments, the locking assembly 240 may be circular to allow it to rotate when engaged to a base. For example, as shown the locking assembly 240 has a cylindrical shape which may correspond to a coupler of a base. The media assembly 232 may have a circular or cylindrical shape as well in one or more embodiments, though this is not required in all embodiments as long as the locking assembly 240 may rotate relative to the media assembly 232.

The media assembly 232 may be configured in a variety of ways. For example, as shown in FIG. 2A, the media assembly 232 comprises an enclosure 216 and a cover 212. In general, the enclosure 216 defines a protected space in which storage media 236 and any associated hardware may be housed. The enclosure 216 may have an open end or section in some embodiments. This allows the storage media 236 and associated hardware to be installed, maintained, replaced, and removed easily.

The open section or end of the enclosure 216 will typically be covered. For example, the enclosure 216 may have its open section covered by the cover 212. This better encloses the storage media 236 and any associated hardware. The cover 212 may be permanently attached to or be part of the enclosure 216, such as to seal the storage media 236 in the enclosure, or may be removably attached to the enclosure, such as to allow removal, repair, or replacement of the storage media and/or associated electronics.

In one or more embodiments, the enclosure 216 may have one or more openings of various shapes and sizes. For example, the enclosure 216 (or other portion of the media assembly 232) may have an opening 220 to allow a communications connection (e.g., an electrical or optical connection) to be made between the storage media 236 and an external device connector or the like. It is contemplated that both male and female connectors may be used with the enclosure 216 and thus the connectors may extend from or be recessed within the enclosure in one or more embodiments. Though illustrated centrally in the media assembly 232, it is noted that an opening 220 may be at various locations. For example, an opening 220 may be of center or near the edges of the media assembly 232.

The media assembly 232, or a portion thereof (such as the enclosure), may include elements which guide or help orient or align the media assembly such that a proper communications connection can be quickly and easily made. For example, as shown in FIG. 2A, the enclosure 216 comprises media guides 244 which help ensure that the media assembly is rotated to a position that allows a communication connection between the storage media 236 in the assembly and an external device connector. The media guides 244 may be configured to correspond to pins or protrusions of a base or coupler, such as described above, to properly align the media assembly when mounted. It is noted that one or more media guides 244 may be provided, that the media guides and corresponding protrusions may have various cross sectional shapes, and that the media guides 224 may extend to various lengths along the media assembly 232.

In one embodiment, the media guides 244 may be spaced along the edge of the media assembly 232 such that the media assembly must be rotated to a particular position in order to allow the pins or protrusions to align with the media guides, thus allowing the media assembly to be mounted. In another embodiment, the media guides 244 of a media assembly 232 may have different cross sectional shapes. In this manner, the media assembly 232 must also be oriented at a particular angle to align pins/protrusions of various shapes with their media guides 244 of a corresponding shape.

It is noted that the media guides 244 may have various configurations. For example, the media guides 244 may be configured as depressions or holes in the enclosure 216 designed to accept a pin or protrusion extending from a portion of the base 116, such as a coupler 108 of the base. It is contemplated that the pin/protrusion may extend from the enclosure 216 and that the depression/hole may be in the base 116 in some embodiments.

The locking assembly 240 may be configured in a variety of ways. As stated, the locking assembly 240 may be configured to secure the media module 104 to a base or coupler, as will be described further below. In one or more embodiments, the locking assembly 240 may comprise a locking cap 204 which may be used to secure the media assembly 232 and/or storage media 236 in place. For instance, the cap 204 may have one or more locking guides 120 which accept one or more pins of a base to secure the cap (and thus the media assembly 232 and enclosure 216) in place, such as described above with regard to FIG. 1.

As can be seen, the cap 204 may comprise an open portion configured to accept the media assembly 232. In this manner, the media assembly 232 may be mounted within the cap 204. This allows the cap 204 to be used to secure or mount the media assembly 232 to a base. The open portion may correspond to the shape of the media assembly 232 in one or more embodiments. For example, the open portion may be circular in one or more embodiments. It is contemplated that the open portion may have a depth such that, when the media assembly 232 is mounted within the cap 204, the bottom surface of the media assembly 232 is flush with the bottom surface of the cap 204. This flush mounting may be used to help ensure a proper communication connection between a storage media's connector and a device connector. Of course, the open portion may be various depths and, rather than being flush with the cap 204, the media assembly 232 may extend out of or be within the cap.

The locking assembly 240 may also include a connecting plate 208 or mount which may be used to rotatably connect the locking assembly 240 to the media assembly 232. For example, the cap 204 may be rotatably mounted to the enclosure 216 of the media module 104 by a connecting plate 208 or mount. This is highly advantageous in that it allows the media assembly 232 to remain connected to a device connector of the base even as the locking assembly 240 or a portion thereof, such as the cap 204, is being rotated.

A rotatable connection may be achieved in a variety of ways. For example, in the embodiment of FIG. 2A, the connecting plate 208 may be attached to an interior portion of the cap 204. The connecting plate 208 may comprise one or more channels 228A, which, in conjunction with one or more connecting pins 224 allow the locking assembly 240 to rotate. To illustrate, the one or more connecting pins 224 may be attached to or extend from the media assembly 232, such as from the media assembly's cover 212 as can be seen from FIG. 2D. The connecting pins 224 may extend into one or more channels 228A of the connecting plate 208. Because the channels 228A may be curved, such as shown in FIG. 2A, the connecting pins 224 and channels, when engaged, guide the locking assembly 240 in a circular or rotational movement.

The locking assembly 240 may be secured to the media assembly 232 in one or more embodiments. In general, this allows the locking assembly 240 to rotate relative to the media assembly 232 without becoming disconnected from the locking assembly 240. This may be accomplished in a variety of ways. For example, the connecting pins 224, channels 228A, or both may be configured to hold the locking assembly 240 and media assembly 232 together. To illustrate, in FIG. 2A, the connecting pins 224 have an enlarged head and a narrower body. The channels 228A have been sized to accept the body of the connecting pins 224, with a portion of the channels being enlarged to accept the enlarged head of the connecting pins 224. The enlarged portion allows the connecting pins 224 to be inserted into the channels 228A. When moved or rotated, the bodies of the connecting pins 224 enter a narrower portion of the channels 228A. In the narrower portion of the channels 228A may be too narrow for the head of the connecting pins 224 to fit through. In this manner, the connecting pins 224 cannot be removed from the channels 228A while in the narrower section of the channels.

It is contemplated that the cap 204 may comprise one or more channels 228B or grooves in some embodiments. These channels 228B may be configured to accept the connecting pins 224 as well. These channels 228B may also be configured to guide the connecting pins 224. This is beneficial in that the additional support or guidance for the connecting pins 224 provides a smoother and/or more reliable rotation of the locking assembly 240. As shown in FIG. 2B, for instance, the cap 204 includes channels 228B that accept a portion of the connecting pins 224, namely the head portion of the pins. The channels 228B have been curved similar to the curve of the connecting plate's channels 228A to guide the locking assembly 240 in a circular or rotational movement relative to the media assembly 232. In this embodiment, the channels 228B have been inset into the cap 204. This allows the connecting plate 208 to be mounted flush to the surface of the cap 204, such as shown in FIG. 2C.

In this embodiment, the head portion of the connecting pins 224 may be snugly held between the connecting plate 208 and the cap 204. This is advantageous because the connecting pins 224 are then supported and guided both at their body and their head portions. To illustrate, the bodies of the connecting pins 224 are guided by the channels 228A of the connecting plate 208 while the heads of the pins are guided by the channels 228B of the cap (when the media module is assembled). This provides a smoother high quality rotation that is also rugged and reliable. It is noted that the combination of channels 228A and channels 228B may be integrally formed in some embodiments. In these embodiments, a separate connecting plate 208 may not be necessary or provided. For example, one or more channels corresponding to the combination of channels 228A and channels 228B may be machined or otherwise formed from a single piece of material in one or more embodiments.

Though it can be seen from the above that the connecting plate 208 may hold the locking assembly 240 to the media assembly 232, it may also be seen that the locking assembly 240 may be disengaged from the media assembly 232 by rotating or moving the locking assembly, media assembly, or both such that the enlarged heads of the connecting pins 224 are positioned at the enlarged portions of the channels 228A. This is advantageous in that, if necessary or desired, the locking assembly 240 can be removed. For example, the user may wish to replace a broken or lower capacity media assembly 232 with one that works or with one that has additional storage capacity. It is also contemplated that additional memory may be added to the device.

It is contemplated that the locking assembly 240 may be prevented from disengaging the media assembly 232 in one or more embodiments. For example, a restrictor assembly may be provided to prevent the locking assembly 240 and media assembly 232 from rotating to an extent where they would become disengaged from one another. The restrictor assembly may be configured in various ways. For example, in one or more embodiments, the restrictor assembly may comprise a keyed or other locking member which may be inserted to prevent the heads of the connecting pins 224 to be positioned at the enlarged portions of the channels 228A. The locking member may be removable in one or more embodiments, to allow the locking assembly 240 to disengage the media assembly 232, such as for the repair or upgrade reasons described above.

Figure 2E:
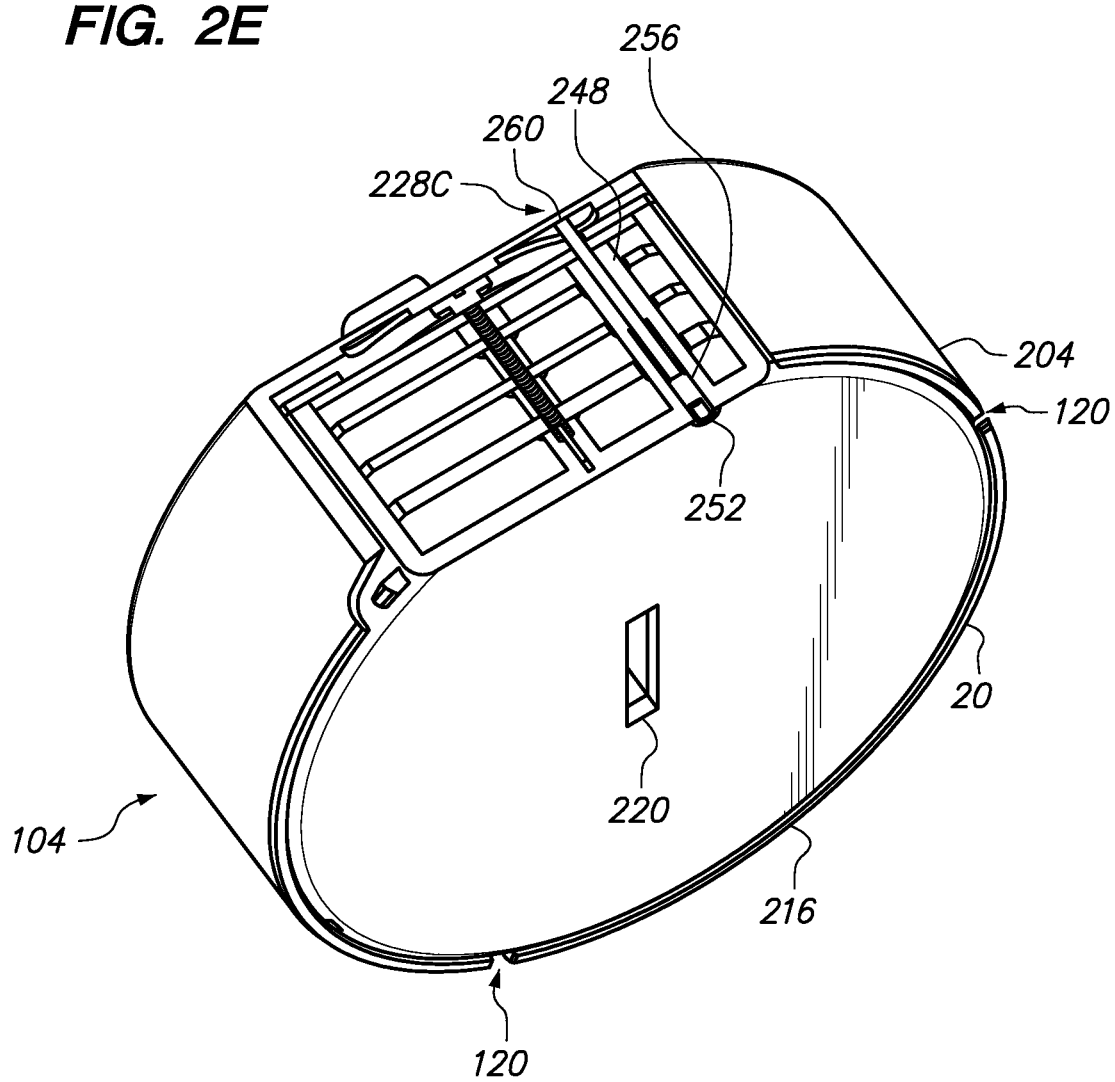
FIG. 2E is a cross-sectional view of an exemplary locking assembly.

FIGS. 2E-2H illustrate an exemplary restrictor assembly configured to prevent the locking assembly from disengaging the media assembly. Referring to FIG. 2E, it can be seen that a locking member 260 may extend between the enclosure 216 and cap 204. The locking member 260 may be a pin or other structure which contacts a portion of the cap 204 to prevent disengagement. For example, as can be seen, a portion of the locking member 260 engages at least one restrictor channel 228C of the cap 204 to prevent the enclosure 216 and cap 204 from rotating such that the connecting pins 224 may be released from the channels 228A.

As stated, in one or more embodiments, the locking member 260 may be removable or disengaged. This may occur by retracting or otherwise moving the locking member 260 such that it no longer serves to physically restrict rotation of the enclosure 216 and cap 204 relative to one another. For example, a restrictor assembly may include a screw or other retention device 252 that may be used to hold the locking member 260 in place, while also allowing the locking member to be disengaged when desired. It is noted that, though not required, a spring or other biasing device 256 may be included in some embodiments to ensure the locking member 260 remains engaged to a channel 228C when in use.

Figure 2F:
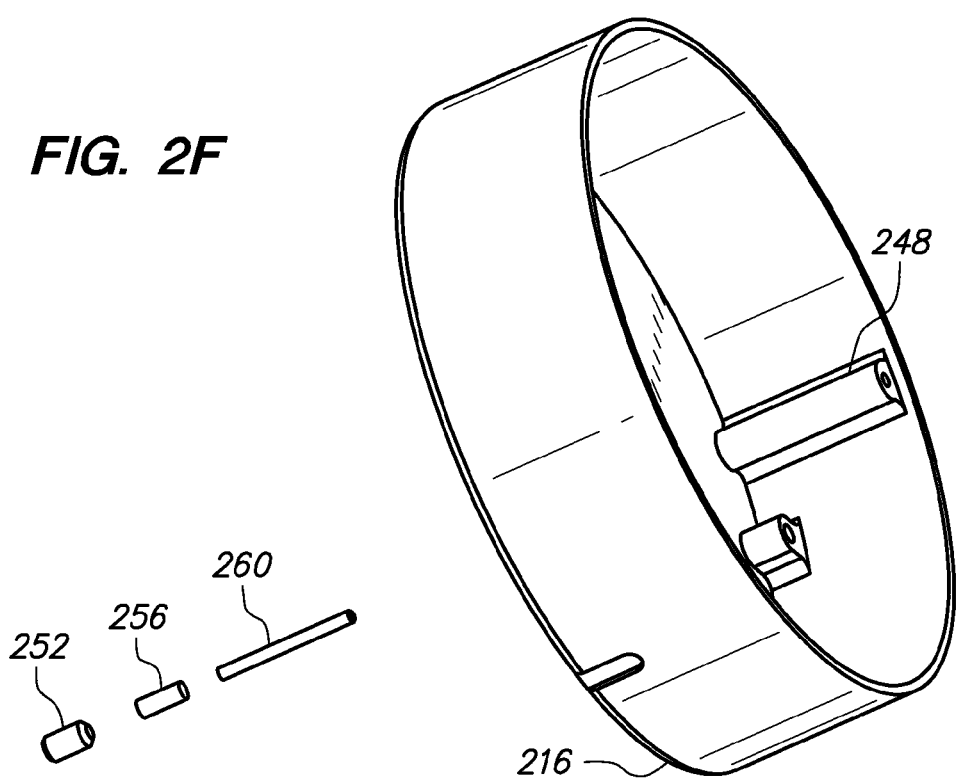
FIG. 2F is an exploded perspective view of an exemplary locking assembly.

The locking member 260 may be supported by a support 248 of a restrictor assembly in one or more embodiments. In general, the support 248 secures the locking member 260 in position relative to the cap 204 as can be seen in FIGS. 2E-2F. For example, the support 248 may be attached to the enclosure 216 in one or more embodiments. The support 248 may be a structure configured to accept the locking member 260. For example, the support 248 illustrated has a tube-like structure configured to accept the locking member 260. In one or more embodiments, the locking member 260 may be movable relative to or within the support 248 to allow the locking member to be removed or disengaged, such as described above.

Figure 2G:
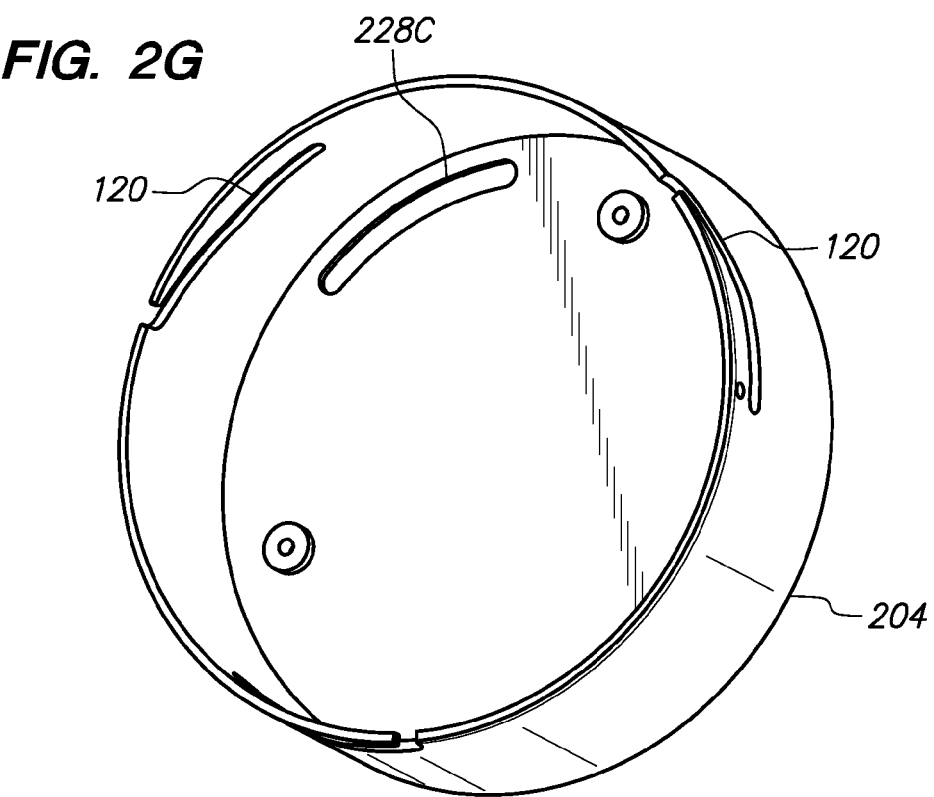
FIG. 2G is a perspective view of an exemplary cap.

In operation, the restrictor assembly generally limits rotation but does not prevent all rotation. This may be achieved in various ways. FIG. 2G illustrates a cap 204 having a restrictor channel 228C that has been curved to allow rotation of a media assembly relative to a locking assembly. The restrictor channel 228C allows to the locking member to move therein during rotation of the media assembly or locking assembly, but is typically configured to block the locking member from moving beyond a certain position. This in turn prevents the media assembly and locking assembly from being rotated to a position where they may be disengaged from one another.

To illustrate, the ends of the restrictor channel 228 may be positioned such that the media assembly and locking assembly may be blocked or otherwise prevented from rotating to a particular position (while the locking member is engaged to the restrictor channel 228C). When the locking assembly or media assembly rotate the locking member may move freely along the restrictor channel 228C until the locking member contacts an end or other obstruction of the restrictor channel. When such contact is made, further rotation in the same direction may be prevented. It is noted that, like the other channels/guides herein, the restrictor channel 228 may be inset (as shown) or extend from the surface to which it is attached or associated.

In one or more embodiments, the cover 212 and/or connecting plate 208 may be configured to allow the locking pin 260 to pass therethrough. This allows the locking pin 260 to reach and traverse the restrictor channel 228C. For example, an opening may be in the cover 212, the connecting plate 208, or both. The opening in the connecting plate 208 may be curved to allow the locking pin 260 to follow a curve during rotation of the media module. In some embodiments, a separate opening need not be provided because the locking pin 260 may be positioned such that it passes through one of the channels 228A of the connecting plate 208.

It is contemplated that one or more stops (e.g., physical obstructions in the path of the locking member 228C when moving) may also be used to prevent such rotation. These stops may be used independent of a restrictor channel 228C or with a restrictor channel, such as by being positioned in the path of the restrictor channel.

Figure 2H:
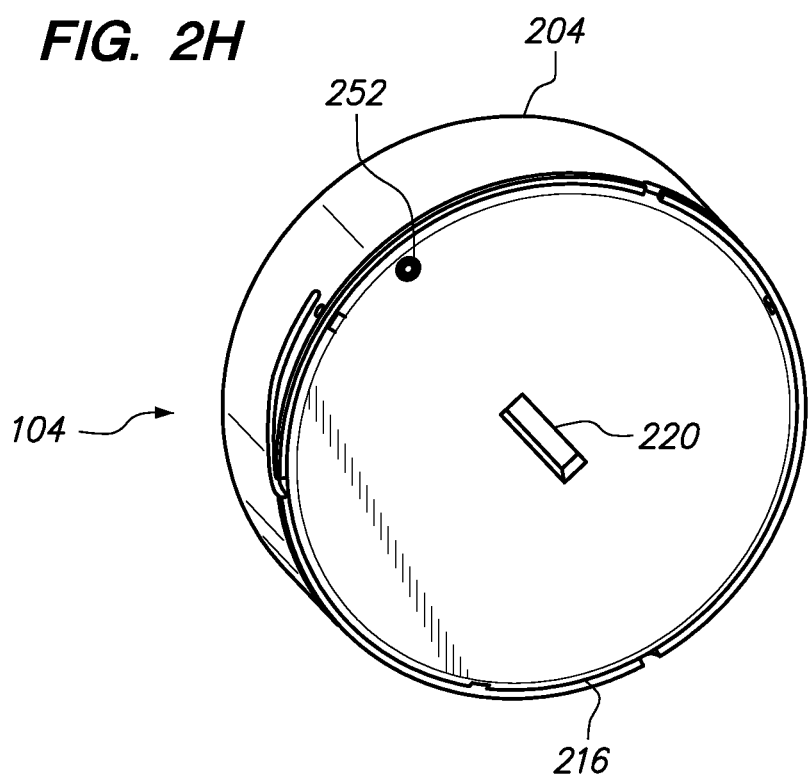
FIG. 2H is a perspective view of an exemplary media module.

Referring to FIGS. 2E and 2H, to allow the locking member 260 to be conveniently removable or disengaged, it is contemplated that the retention mechanism 252 holding the locking member may be externally accessible. For example, the retention mechanism 252 may be accessible on an outer surface of the media assembly. In one or more embodiments, the retention mechanism 252 may be a screw or other twist-lock fastener which may be turned to secure as well as to release itself and the locking member 260. Of course other retention devices 252 may be used to hold the locking member 260 in position, while also allowing the locking member 260 to be removed or disengaged when desired.

It will be understood that the restrictor assembly may have a variety of configurations which may be used to restrict rotation. For example, in one embodiment, the locking member may be held or attached to the cap rather than the enclosure. In this embodiment, one or more restrictor channels, stops, or both may be on the enclosure, such as on the cover of the enclosure. In this manner, a locking member may extend from the top of the cap towards the restrictor channels, stops, or both of the enclosure cover.

In one or more embodiments, the media module may comprise one or more holding elements which hold the locking assembly 240 and media assembly 232 at one or more angles relative to one another. This is beneficial in that for example, the locking assembly 240 and media assembly 232 could be held in position relative to one another such that the media guides 244 and locking guides 120 are aligned to allow a pin or protrusion to enter both the media guides and the locking guides 120 when the media module 104 is being secured to a base 116.

The holding elements may be configured to hold the locking assembly 240 and media assembly 232 such that sufficient rotational force may release the hold and allow the assemblies to rotate relative to one another. For example, in the above example, the user may rotate the locking assembly 240 to release the hold of the holding elements and secure the media module 104 to the base 116.

Holding elements may be configured in various ways. In one embodiment, the holding elements may comprise a ball and socket mechanism, where the socket accepts the ball to releasably hold the ball in position. The ball may extend from the enclosure 216 while the socket is located on an interior portion of the cap 204, or vice versa. In this manner, the ball and socket mechanism may hold the cap 204 and enclosure 216 at an angle relative to one another depending on the positioning of the ball, the socket, or both.

In one or more embodiments, the ball may extend from the curved exterior of the enclosure 216 while the socket may be formed in the curved portion of the cap 204. The ball is beneficial in that it may contact and roll along the curved portion of the cap 204 as the cap is rotated relative to the enclosure 216. Contact between the cap 204 and the enclosure 216 via the ball helps keep the enclosure centered within the cap 204. It is contemplated that the ball may be forced outward by a biasing device, such as a spring in one or more embodiments to ensure contact with the socket and/or the cap 204 as the cap is rotated. It is noted that holding elements may be used in addition to or instead of a retention mechanism in one or more embodiments.

Figure 3A:
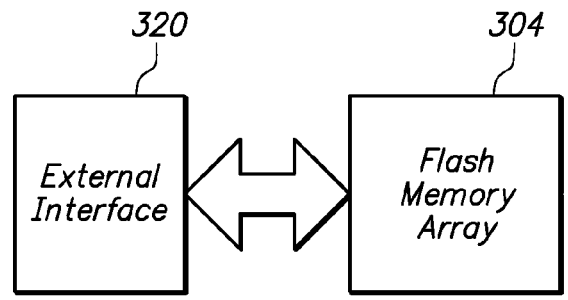
FIG. 3A is a block diagram of an exemplary storage media.
Figure 3B:
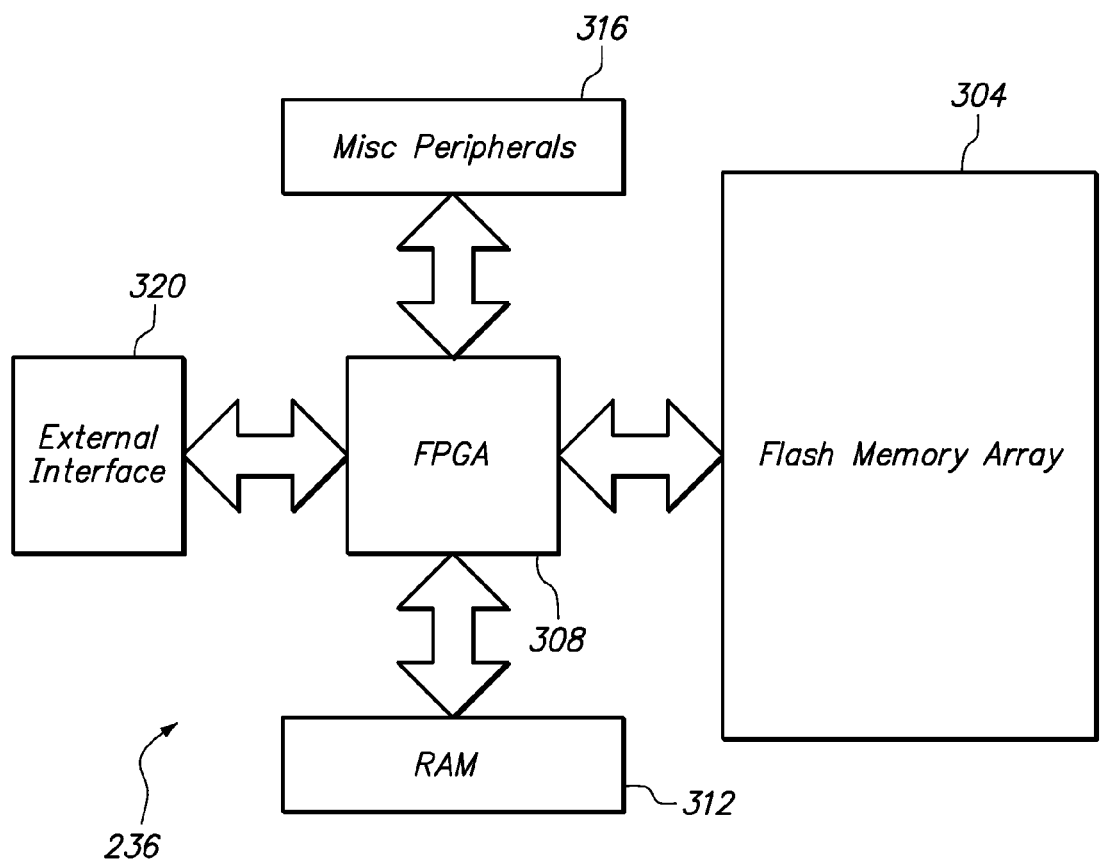
FIG. 3B is a block diagram of an exemplary storage media.

FIGS. 3A-3B illustrates an exemplary configuration of a storage media 236. As can be seen, the storage media 236 may include components other than memory or storage devices. In general, these components facilitate storage and retrieval of information to/from a memory or storage device, however, additional functionality may be provided as well. As shown, the memory or storage device has been labeled as a flash memory array 304. It will be understood that a variety of memory or storage devices, other than flash memory may be used. For example, the memory or storage device may comprise various machine readable storage mediums such as magnetic media, RAM, ROM, optical media, among others.

In one embodiment, the storage media 236 may comprise a flash memory array 304 and an external interface 320 configured to provide access to the array, such as illustrated by FIG. 3A. For instance, the external interface 320 may permit communications between a device and the flash memory array 304 to read from and/or write to the array. The external interface 320 may also allow other communication between the storage media 236 and a device. For instance, as will be described further below, the external interface 320 may allow the storage media 236 to be configured and/or updated through the device.

The external interface 320 may be hardware configured to interface with the base and/or a device that uses the media module. The external interface 320 may comprise various electronic components to properly interface with the device. For example, the external interface 320 may comprise an integrated circuit, microprocessor, microchip, controller, or the like configured to communicate with the device. To illustrate, the external interface 320 may comprise a USB, SATA, IEEE 1394, Ethernet, Fiber Channel, PCI Express, XAUI, RapidIO, Infiniband or other controller to communicate with various devices.

The external interface 320 may also comprise one or more connectors for making a physical connection to allow communication with the device. For example, the external interface 320 may comprise any type connector including but not limited to a USB 2.0 or 3.0 or any USB standard developed in the future, Firewire, Thunderbolt, Light Peak, serial connection, wireless 801.xx wireless standard, or any Ethernet standard. Typically, the connector will be configured to connect with a device connector 112, such as illustrated in FIG. 1. It is contemplated that a variety of electrical and optical connectors, including proprietary and standardized connectors, may be used in one or more embodiments.

It is noted that the external interface 320 may be configured to support a plurality of communications standards. For example, the external interface 320 may be configured to interface with USB, Firewire, Ethernet, other devices, or various combinations, in one or more embodiments. Alternatively, or in addition, a plurality of external interfaces 320 may be provided to allow the storage media 236 to be used with devices having various ports or communications capabilities. Accordingly, there may be one or more connector configurations to allow physical connections with these devices. Data transfers or other communications to/from the external interface 320 may be bidirectional or may be unidirectional with the direction of the data flow being controlled by an electrical signal or command.

FIG. 3B illustrates another embodiment of the storage media 236. As can be seen, additional components may be included, such as to provide additional features or functionality. In the embodiment, of FIG. 3B for example, the storage media 236 comprises a field programmable gate array (FPGA) 308. It is noted that though referenced herein as an FPGA, other types of integrated circuits, microprocessors, controllers, or the like may be used in lieu of an FPGA in some embodiments. The FPGA 308 is advantageous in that it may be configured and reconfigured by updating one or more instructions or machine readable code that it executes. Typically, the FPGA 308 will be physically configured to store or embody the machine readable code.

In addition or alternatively the FPGA 308 (or other integrated circuit) may execute machine readable code stored on a portion of the flash memory array 304. The flash memory array 304 may also be used as storage for variables, data structures, or the like as may be needed by the machine readable code as it executes. It is noted that RAM 312 may be provided in some embodiments, to store such information. The flash memory array 304 may also be used to store configuration settings or the like for the storage media 236.

In one or more embodiments, the FPGA 308 coordinates access to the flash memory array 304 and other features of the storage media 236. For example, the FPGA 308 may provide requested data from the flash memory array 304 to the external interface 320 for communication with a device. The FPGA 308 may also write data from the external interface 320 to the flash memory array 304. The FPGA 308 may comprise one or more instructions (or execute machine readable code having these instructions), such as read and/or write caching instructions to improve read/write performance of the flash memory array 320. It is contemplated that the FPGA 308 may also or alternatively utilize the RAM 312 for caching data. This is advantageous in that the RAM 312 will typically have higher read/write performance than the flash memory array 320. This is especially beneficial in the film industry to where large volumes of video data must be stored and retrieved rapidly.

One or more peripherals 316 may be included in some embodiments. For example, one or more peripherals 316 may be in communication with the FPGA 308 in some embodiments. The peripherals 316 may be configured to provide additional functionality or features. For instance, in one embodiment, the peripherals may be one or more indicators, such as one or more lights, displays, or the like to provide status or other information for the storage media 236. To illustrate, one or more indicators may be included to indicate used/available storage capacity, read/write access to the flash memory array 304, receive/transmit activity on the external interface 320, read/write speed, date information, time information, the like, or a combination thereof. This information may be presented in various ways. For example, the information may be presented by one or more graphics, text, or even with one or more lights. It is contemplated that the one or more indicators may be mounted to the media module, its base, or both.

As the following examples illustrate, a variety of other peripherals 316 may be provided as well. For example, in one embodiment, a battery my be provided such as to power a clock or to ensure data is reliably stored on the flash memory array 304 such as by allowing the storage media 236 to complete writing data even if external power is lost. In another embodiment, a peripheral 316 may be a network communications interface, such as a wireless or wired network interface to allow the data on the flash memory array 304 to be accessed via a network. In yet another embodiment, a peripheral 316 may be a display or screen configured to present data on the flash memory array 304. For example, the display may present videos (as well as audio, text, graphic, and other files) stored on the flash memory array 304.

In one or more embodiments, the one or more peripherals 316 may be built-in to the media module. In other embodiments, the peripherals 316 may be removable. For example, the media module may comprise a peripheral port to allow connections to various peripherals 316. In this manner, a wide variety of peripherals 316 may be used with the media module.

Operation of the mounting system will now be described with regard to FIGS. 4A-4E. In general, these figures illustrate the mounting and dismounting of a media module 104 to a base 116. It is noted that though a particular base 116 has been illustrated, the base may have various configurations, including configurations where the base 116 may be integrated into a device (as will be described further below).

Figure 4A:
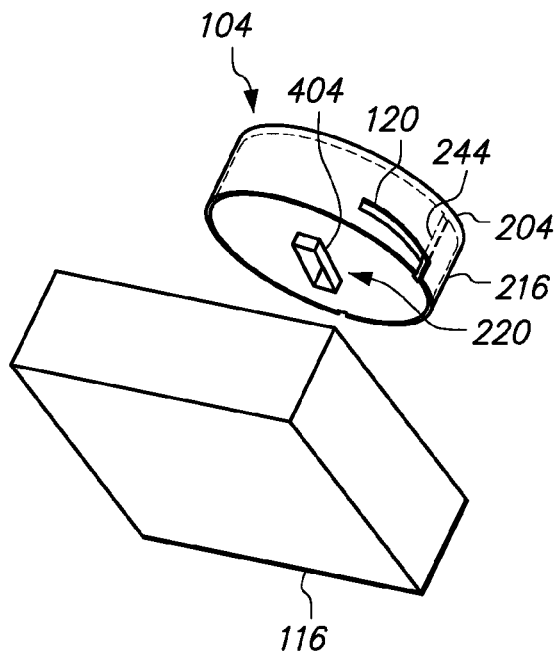
FIGS. 4A-4E illustrating mounting and dismounting with an exemplary mounting system.

FIG. 4A shows how the media module 104 may be positioned relative to the base 116 prior to mounting the media module to the base. As can be seen, the media module 104 will typically be oriented such that a connector 404 of the media module 104 (or the storage media therein) is facing towards the base 116. It is noted that the connector 404 may extend outward from the media module 104 in some embodiments (such as illustrated), while in others the connector 404 may be inset or flush with the surface of the media module. It will be understood that the device connector of the base 116 may be configured accordingly to accept or engage the connector 404.

FIG. 4A also shows that the locking assembly 240 and media assembly 232 of the media module 104 may be aligned to permit the media module to be mounted to the base. For instance, as shown by FIG. 4A, one or more locking guides 120 of the locking assembly 240, or portions thereof, may be aligned with one or more media to guides 244 of the media assembly 232. In this manner, the open end of the one or more locking guides 120 may be aligned with the one or more media guides 244. This allows the media module 104 to engage one or more pins of the base 116, as will be described further below.

It is contemplated that the media assembly 232 and the locking assembly 240 may be aligned by the user rotating the assemblies such that the opening of the locking guides 120 are aligned with the media guides 244. Alternatively, or in addition, the assemblies may be configured to automatically align. For example, one or more springs or the like may be used to push or pull the assemblies into alignment. The force provided by the springs may be overcome to twist the locking assembly 240 relative to the media assembly 232, or vice versa. In this manner, the springs align the assemblies when the media module is not mounted. This prepares the media module for subsequent mounting by aligning the assemblies, which allows a user to quickly mount the media assembly.

Figure 4B:
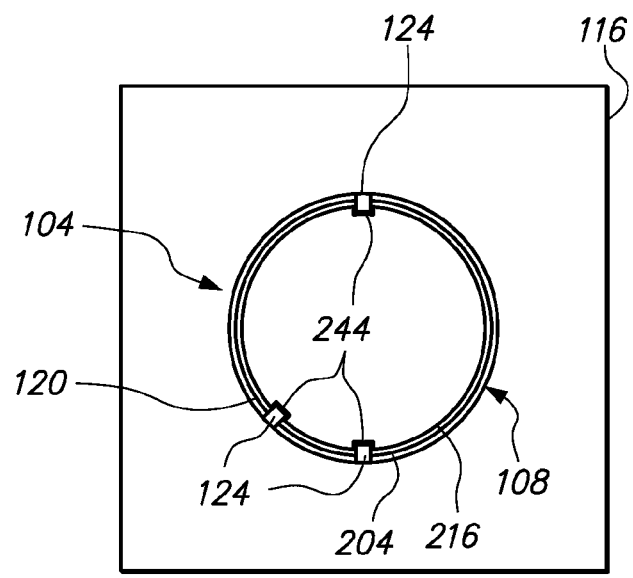

As shown in FIG. 4B, the media module 104 may be aligned with the base 116 prior to mounting the media module. In one or more embodiments, this may be accomplished by aligning the one or more media guides 244 of the media assembly 232 with the one or more pins 124. In addition, the one or more locking guides 120 of the locking assembly 240 may be aligned with the one or more pins 124. Typically, both the locking guides 120 and media guides 244 will be aligned with the pins 124. For example, as described with regard to FIG. 4A, the locking guides 120 and media guides 244 may be aligned to themselves first. This allows the locking guides 120 and the media guides 244 to be simultaneously aligned with the pins 124. Once this alignment is complete, the media module 104 may be, at least partially, inserted into the base 116.

As discussed above with regard to FIG. 1, the pins 124 may be positioned (or otherwise configured) to ensure that the media module 104 is properly oriented as it is mounted to the base 116. This ensures that a proper communications connection can be made between the storage media and a device. FIG. 4B illustrates one configuration of the pins 124 where, as can be seen, the pins have been positioned such that the media module 104 must be at a particular orientation to accept or engage the pins (i.e., to align with the pins). In this orientation, the connector of the media module may also be aligned with the device connector of a base or device such that a communications connection may be properly made. It will be understood that other positions for the pins 124 may be used and that, as stated above, the pins 124 may also have various shapes to ensure the media module 104 is properly oriented during mounting.

Figure 4C:
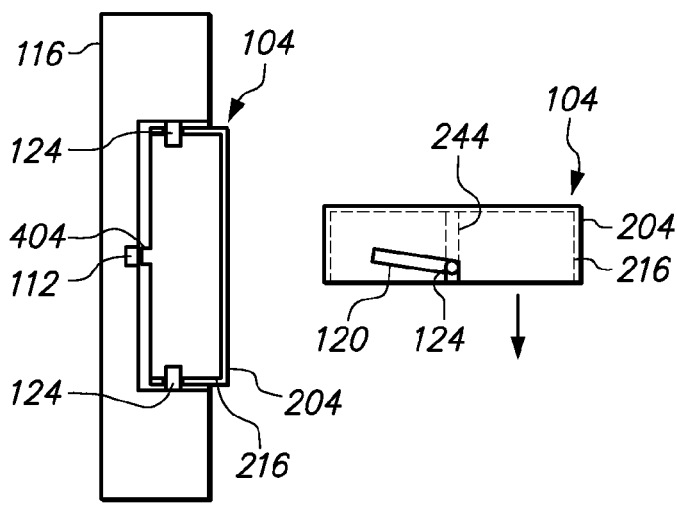

FIG. 4C illustrates the media module 104 partially mounted to the base 116. As can be seen, the pins 124 may be engaged by the locking guides 120 and media guides 244 of the media module 104 at this point. The media module 104 may only be partially inserted into the base 116 at this point because the pins 124 may be contacting a bend or curve of the locking guides 104. As can be seen from FIG. 4C for example, the pins 124 have contacted a bend in the locking guides 120.

Figure 4D:
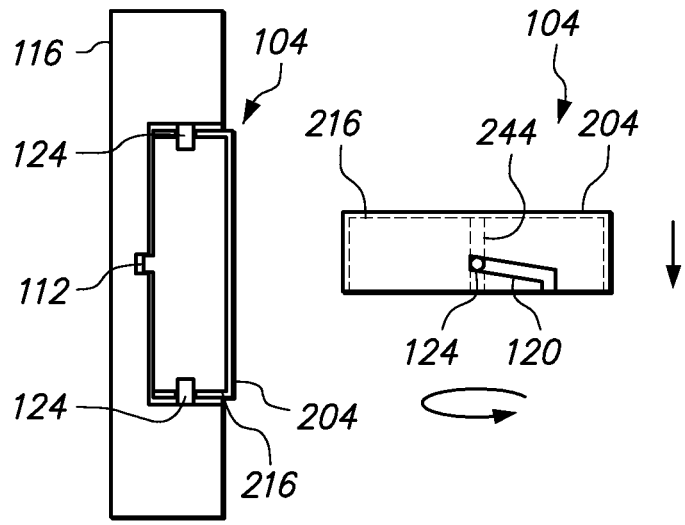

To fully mount the media module 104, the locking assembly 240 may be rotated, such as illustrated in FIG. 4D. In general, this secures the media module 104 to the base 116 and ensures that a proper communications connection is made with the media module's storage media. As can be seen from FIG. 4D for example, the connector 404 of the media module 104 has made a connection with the device connector 112 of the base, allowing access to the storage media in the media module. In addition, the media module 104 has been fully inserted into the base 116 helping to ensure that the connection is maintained and that the media module is secured to the base.

In one or more embodiments, rotation of the locking assembly 240 generally causes the media module 104 to move further into the base 116. Because the locking assembly 240 and media assembly 232 may rotate relative to one another, the alignment between the connector 404 and the device connector 112 may be maintained (ensuring a proper communications connection is made) even while the locking assembly 240 is rotated.

In general, rotation of the locking assembly 240 causes the pins 124 to travel from a first portion of the locking guides 120 into a second portion of the locking guides. For instance, in FIG. 4C, the pins 124 have entered a first portion of the locking guides 120. In FIG. 4D, the locking assembly 240 has been rotated such that the pins 124 may enter a second portion of the locking guides 120 and travel further into the locking guides. The upwardly angled second portion of the locking guides 120 cause the media module 104 to move further into the base 116 as the locking assembly 240 is rotated. In the embodiment of FIG. 4D, this causes the connector 404 to connect with the device connector 112.

It is noted that the first portion and second portion of the locking guides 120 will typically be angled relative to one another to allow the locking assembly to secure the media module 104 to the base 116 when rotated. However, other configurations may also be used. For example, the second portion may be curved to secure the media module 104.

As can also be seen in FIG. 4D, the media assembly 232 remains aligned by the pins 124 as the locking assembly 240 is rotated. This is because the media assembly 232 is guided by the pins 124 and the media assembly's media guides 244 as the media module 104 moves further into the base 116.

The shape or configuration of the media guides 244 guide the media assembly 232 into the base 116 at the proper orientation or alignment. For instance, in FIG. 4D, the media guides 244 are substantially straight. In this configuration the media assembly 232 is guided in a linear fashion into the base 116. Because the media assembly 232 and locking assembly 240 may rotate relative to one another, the media assembly 232 moves straight into the base 116 (forming the proper communications connection), despite the rotation of the locking assembly 240 to secure the media module.

The media module 104 may be considered secured to the base 116 when the pins 124 reach the fullest extent of the locking guides 124, such as illustrated in FIG. 4D. Of course the media module 104 may be secured with the pins 124 at other positions. In general, the clamping force and friction generated by rotating the locking assembly 240 holds the media module 104 securely to the base 116. It is contemplated however, that one or more structures or devices may be used to further secure the media module 104.

For example, in one embodiment, the locking guides 120 may have a notched or other portion which accepts the pins 124. The notched portion may be slight such that they resist unintended movement of the locking assembly 240 but still allow a user to easily rotate the locking assembly to mount and dismount the media assembly 104.

Figure 4E:
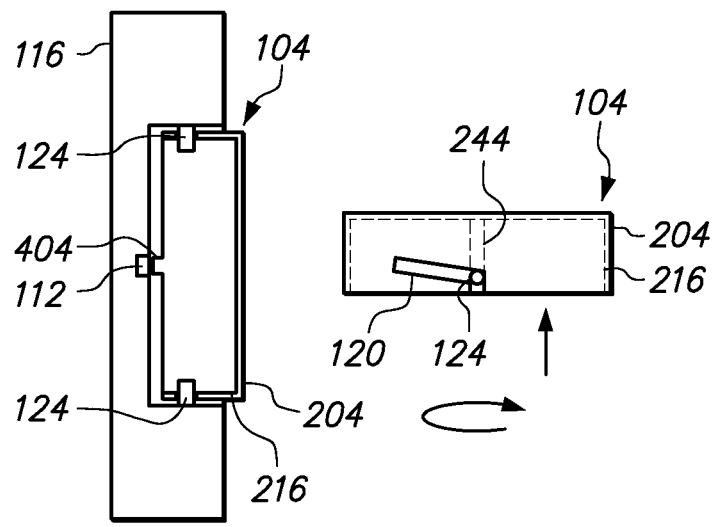

To dismount the media module 104, the locking assembly 240 may be rotated in the opposite direction. This moves the pins 124 back towards the openings of the locking guides 120 such as shown in FIG. 4E. The rotation also causes the media module 104 to move away from the base 116 as the angled portion of the locking guides 120 guide the media module. This may also disconnect the communications connection between the connector 404 and device connector 112 in some embodiments. In this position, it can be seen that the locking guides 120, media guides 244, and pins 124 may be in alignment. The media module 104 may then be removed from the base 116 by moving the media module such that the pins 124 exit the open end of the locking guides 120.

It is noted that in embodiments where the media assembly 232 and locking assembly 240 are configured to automatically align (such as a spring loaded embodiment), once the frictional or other force securing the locking assembly is overcome, the media assembly and locking assembly may automatically move to the aligned position such as shown in FIG. 4C. Stated another way, the locking assembly 240 may automatically rotate to the aligned position (thus moving the media module 104 away from the base 116). The user may then simply remove the media module 104 from the base 116.

As can be seen, the mounting system allows the media module 104 to be quickly mounted and dismounted by a user applying a twisting or rotating motion. The user need not worry about aligning the connector 404 and device connector 112 because the mounting system automatically aligns these components to ensure a proper communications connection is made. To secure the media module 104, the user may simply rotate the locking assembly 240 until there is sufficient compressive/frictional or other force to hold the locking assembly, and thus the media module in place relative to the base 116. The media module 104 may be dismounted just as easily by rotating the locking assembly 240 in the opposite direction. In spring loaded or similar embodiments, the locking assembly 240 may only need to be "loosened" because the spring(s) may automatically align the locking assembly and media assembly 232 for removal from the base 116.

Another benefit of the mounting system is that it permits media modules 104 to be mounted and dismounted with one hand. This is advantageous in that it frees the user's other hand for other tasks. For example, a camera operator may hold his or her camera in a ready position while quickly installing, removing, or swapping media modules 104. This allows recording to occur with minimal downtime.

The mounting system may be used with various devices, including video recording, editing, and playback equipment. It will be understood that other devices that utilize data storage may also use the mounting system. Some exemplary devices that may use the mounting system will now be described with regard to FIGS. 5A-5F.

Figure 5A:
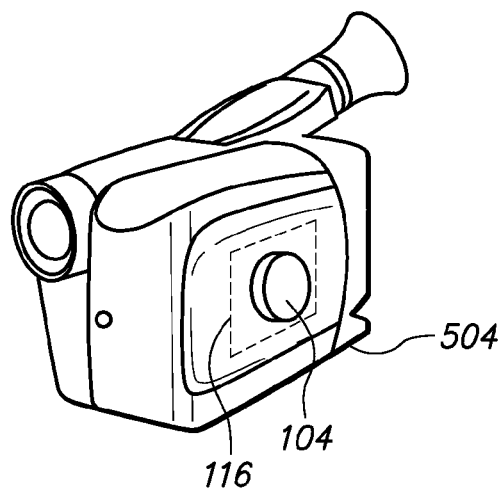
FIGS. 5A-5F illustrating exemplary devices utilizing an exemplary mounting system.

FIG. 5A illustrates a camera, such as a video camera 504, which may utilize the mounting system. As can be seen, the camera 504 may have a base 116 of the mounting system formed integral with a portion of the camera's body. In this manner, a media module 104 may be mounted to the camera 504. This is highly beneficial, especially to professional camera operators or filmmakers, because the mounting system's rapid mounting and dismounting of media modules 104 allows media modules to be quickly swapped. For example, a media module 104 that is full or near full may be quickly exchanged for another media module so that recording may continue.

In some embodiments, the mounting system may be carried by a user. For example, FIG. 5B illustrates a harness or belt which may be worn by a user. The harness 508 may comprise one or more bases 116 for accepting one or more media modules. In some embodiments, the bases 116 may be connected to a device, such as a camera 504, via a cable 512 to allow access to the media modules 104. It is noted that multiple media modules 104 may be combined in some embodiments. For example, as shown, the harness 508 include three mounting systems each capable of mounting a media module 104. This is beneficial in that the additional media modules 104 may be used to increase storage capacity, make multiple copies of a recording, increase read/write performance (such as in a RAID configuration), or a combination thereof.

It is contemplated that the harness 508 may also serve as storage for one or more media modules 104. For example, the harness 508 may comprise one or more bases 116 configured only to physically store media modules 104. Alternatively or in addition, the harness 508 may comprise one or more holsters for storing media modules 104. In this way, the harness 508 keeps extra media modules 104 within reach of the user for quick and convenient access. For example, the user may swap media modules 104 between a camera 504 and the harness 508 without having to first to find and retrieve a media module from a remote location or an inconvenient container.

One benefit of the mounting system herein is that media modules 104 may be removed from a camera 504 and quickly mounted on other devices to edit or processes the newly recorded video. For example, FIG. 5C illustrates an editing workstation in the form of a laptop computer 516. In this embodiment, newly recorded or other video may be dismounted from a camera 504 and quickly mounted on the laptop computer 516. An editor may then immediately begin editing or otherwise preparing the video for viewing. This is highly beneficial in live or near-live broadcasts where editing prior to broadcast or viewing is desired. In the meantime, another media module 104 may be mounted to the camera 504 to allow video recording to continue. As can be seen, the mounting system minimizes the time it takes to move video from one device to another. In fact, the transfer time to download (or otherwise electronically transmit) a video may be slower than the time it takes to dismount a media module 104 and re-mount the media module to another device.

Figure 5D:
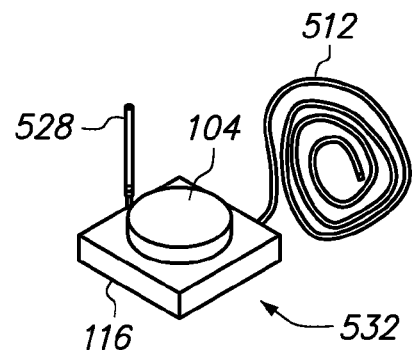
Figure 5B:
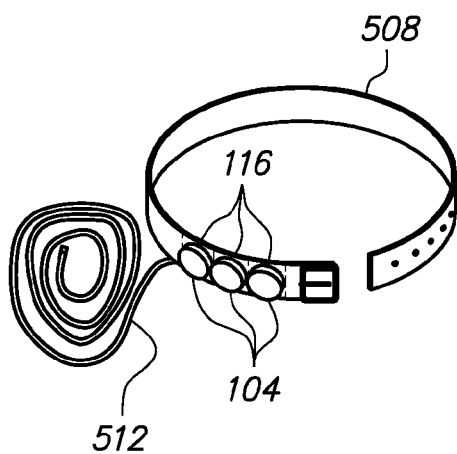

FIG. 5D illustrates a module reader 532 comprising a base 116 for accepting one or more media modules 104. The reader 532 may be configured as a device for providing read/write access to the storage media in the media modules 104. For example, the reader 532 may comprise a cable 512 for connecting the reader to cameras, computers, or other devices. Alternatively or in addition, the reader 532 may comprise a wireless transceiver 528 to provide wireless access to the media modules 104. It is contemplated that the reader 532 may be configured to share the media modules with multiple devices at once, such as via a wired or wireless connection or network.

Figure 5E:
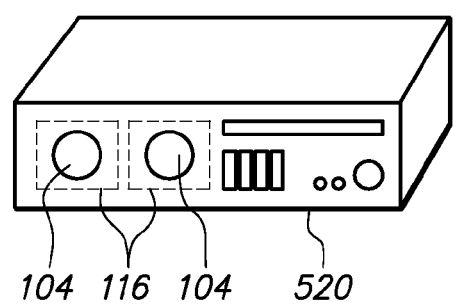
Figure 5C:
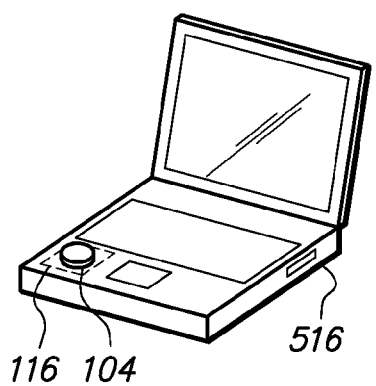

FIG. 5E illustrates exemplary video editing hardware 520 that may utilize the mounting system. As can be seen, the editing hardware 520 may comprise one or more bases 116 (in this case two bases) for accepting various media modules 104. The editing hardware 520 may be configured to edit videos on the media modules 104, make copies of media modules, play the media modules, etc. . . . The editing hardware 520 may comprise one or more storage devices as well. For example, the editing hardware 520 may comprise one or more hard drives or the like to offload video data from the media modules 104. The media modules 104 may then be returned to use. Alternatively or in addition, the storage devices may permit data from the media modules 104 to be stored on other media. For example, the storage devices may be DVD, CD, BluRay, or other drives configured to write data to various media.

Figure 5F:
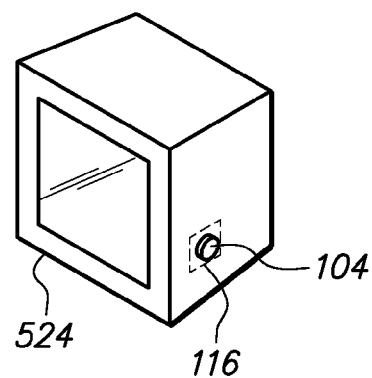

It is contemplated that the mounting system may be integrated or used with playback devices as well. For example, FIG. 5F illustrates a display screen 524 configured with a base 116. In this manner, videos may be directly played by the display screen 524 by mounting a media module 104 on the screen's base 116. To view other videos, various media modules 104 may be mounted to the display screen 524 via the base 116. This is beneficial in that rather than transferring video data to a playback device, the video may be quickly moved to the playback device. For example, newly recorded and/or edited video may be dismounted from the base 116 of one device and mounted on the base of a playback device for immediate viewing/review. This speed allows the video to be quickly prepared and reviewed at least once prior to being distributed or viewed by the video's intended audience. To provide additional functionality and control of the media module a method and apparatus for access control to the module and module compatibility is disclosed. As discussed above, the media module is configured to interface with a camera to store image and audio data from the camera on the memory within the media module. To control which media modules can interface with a camera or any other read/write device, a method and system for data encryption or authentication of the media module is disclosed. This encryption or authentication may be configured to control the usage of the media module entirely, or limit usage to a particular camera, camera line, or camera manufacturer. Although described on the context of a camera, any read/write device may replace the camera. The encryption or authentication may also control access to features of the media module. Example feature sets include, but are not limited to, an ability to read, write, erase, access a read/write log, the number of write operations which can be performed, the ability to change who has access to these features or any other feature that may be associated with a media module.

In one example provided for purposes of discussion, companies A and B produce the same general memory units. However, company A may not want customers to buy the memory units from company B and use them on company A equipment. This may occur for a variety of reasons including business reasons or to insure technical compatibility. With the encryption or authentication method disclosed herein, company A can electronically brand the memory units and disable their usage until an authentication or encryption exchange is successful, which would only occur with company A's equipment. The authentication used is such that it cannot be reverse engineered or hacked by extrapolating data from the memory unit.

In addition, once this authentication scheme is in place, a company or a user can decide what features to allow/deny based on the authentication level. For example, the company or user can allow the memory units within the media module to be read without restriction and only block write access. Another setting can allow the memory to be read or written, but not erased. And yet another setting could selectively grant/deny access to portions of the memory unit.

It is contemplated that any authentication or encryption method may be used. In one embodiment, the operation is a one-way hash function such as an MD5 or SHA-1 variation including SHA-256. In another embodiment, the encryption comprises an asymmetric encryption method such as RSA or DES. Other encryption schemes such as symmetric encryption (AES for example) could also be used.

In one embodiment authentication may be implemented and performed by one or more SAM (secure access module) standing alone, in the memory unit, or as part of any other element of the media module. This SAM can either be a physical part (integrated circuit) or a software based core running inside an FPGA or CPU. Using a separate SAM is advantageous because these parts usually have unique IDs and reduce programming costs and time.

During operation, when the media module, which may be referred to herein as the target, is connected to a device (host) such as a camera, the device starts the authentication process. The memory unit then decides (based on the success of the authentication and the setting exchange) which features to allow access.

The device also decides (based on the setting exchange) if the memory is authorized to work with this device. For example, the recording device from company A may be configured to reject any memory units, such as media modules, from company B.

Figure 6A:
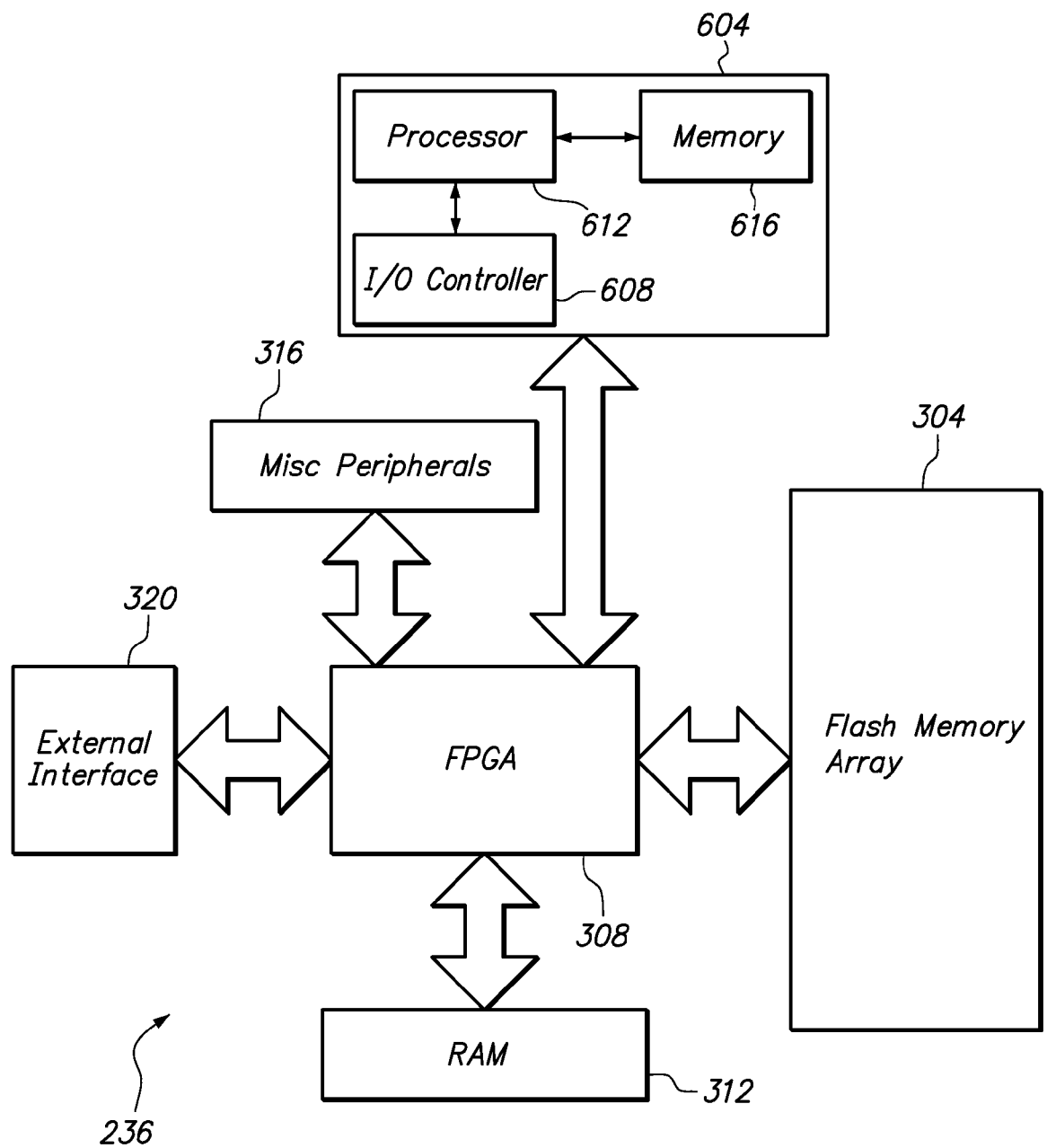
FIG. 6A is a block diagram of an exemplary storage media with an authentication module.

FIG. 6A illustrates an example embodiment of the electronics of the media module configured with an authentication module. This is but one possible configuration and as such it is contemplated that one of ordinary skill in the art may arrive at other embodiments which do not depart from the claims that follow. This embodiment is generally similar to the embodiment of FIG. 3B, but with additional functionality, which is described below. As compared to FIG. 3B, similar elements are labeled with identical reference numbers. The embodiment of FIG. 6A includes an authentication module 604 which communicates with the FPGA 308 as shown.

In this embodiment the authentication module includes an input/output controller 608, a processor or FPGA 612, and a memory 616. As shown, the I/O controller 608 operates to oversee and control input and output of commands, hash values, keys, or any other type of data between the authentication module 604 and the FPGA 308. I/O controllers are known in the art and as such are not described in detail herein. In one embodiment, the I/O controller 608 may be controlled responsive to the operation of the processor 612.

The processor 612 receives input from the I/O controller 608 and processes the input from the I/O controller based on logic instruction set or according to machine readable code. The machine readable code may be stored on the memory 616 or any other memory that is part of the media module. Although show as a processor 612, the authentication module 604 could also or alternatively be configured with a FPGA, ASIC, logic, ARM or any other type processor or controller configured to operate as described herein.

The memory 616 may comprise any type memory capable of storing machine readable code which is executable by the processor 612 or one or more items of data, which may be used in the authentication process. In one embodiment the memory 616 is configured with machine readable code configured to perform the authentication routines or operations described herein.

In operation, the FPGA 308 may be required to perform an authentication operation or routine prior to executing a command from a host, such as a recorder device or reader. In such an event, the FPGA 308 forwards the authentication or encryption/decryption request, which may accompany the command, to the authentication module 604. The authentication module 604 processes the request in view of the associated command to determine if the media module, or device, is authenticated or the command is decrypted. One example of a command is a request by the camera to perform a function, such as read/write/erase on the memory of the media module. The camera may be referred to as the recorder, device or host.

Figure 6B:
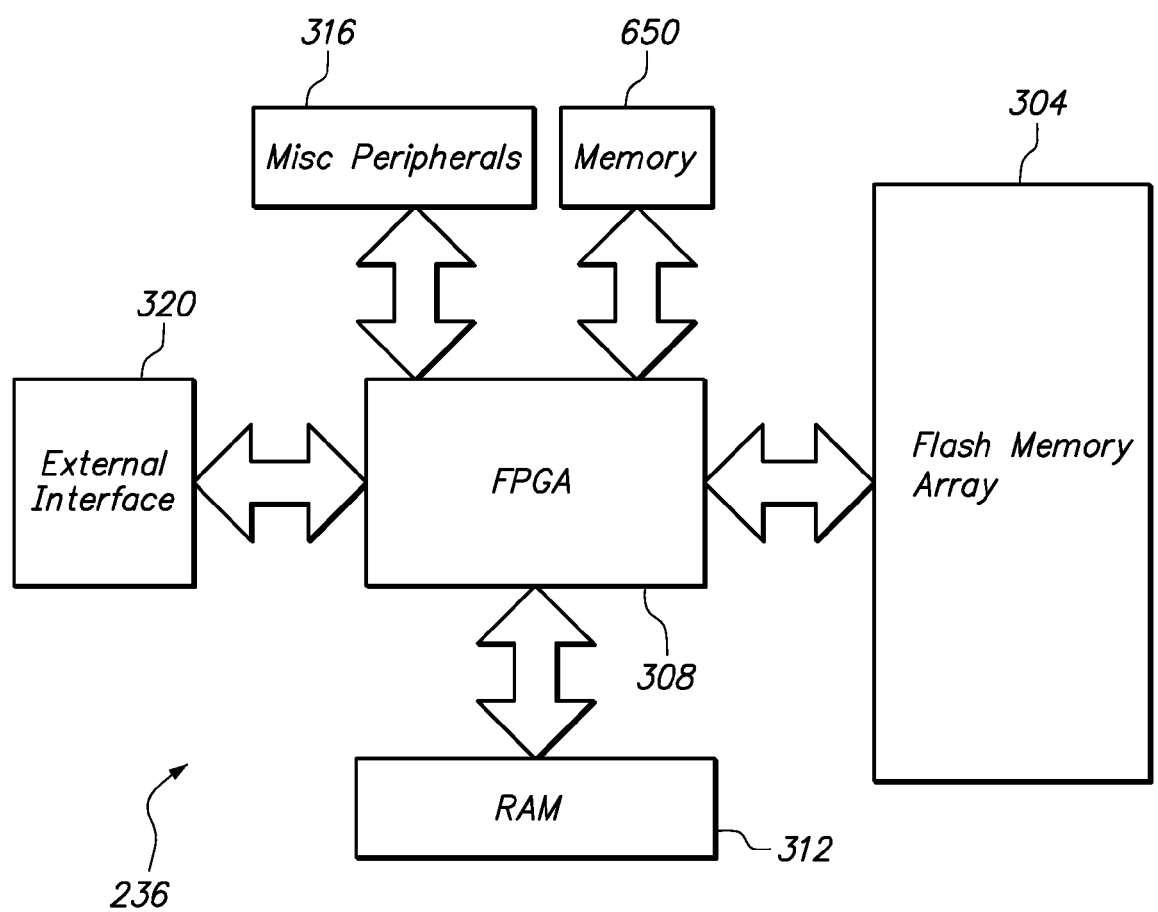
FIG. 6B illustrates a block diagram of an exemplary storage media with additional memory.

FIG. 6B illustrates an alternative embodiment of the media module electronics. This is but one possible configuration and as such it is contemplated that one of ordinary skill in the art may arrive at other embodiments which do not depart from the claims that follow. This embodiment is generally similar to the embodiment of FIG. 3B and FIG. 6A. As compared to FIG. 3B and FIG. 6A, similar elements are labeled with identical reference numbers.

The embodiment of FIG. 6B includes a memory 650 which communicates with the FPGA 308 as shown. The memory 650 may be configured to store machine readable code configured to execute on the FPGA 308 to perform authentication of a media module (target) with a camera or reader device (host). The memory 650 may also store one or more codes or keys which are used in the authentication process. The machine readable code configured for authentication, as well as the codes or keys used in the authentication process may also be stored on the memory 304, in which case the memory 650 may or may not be necessary.

Figure 7:
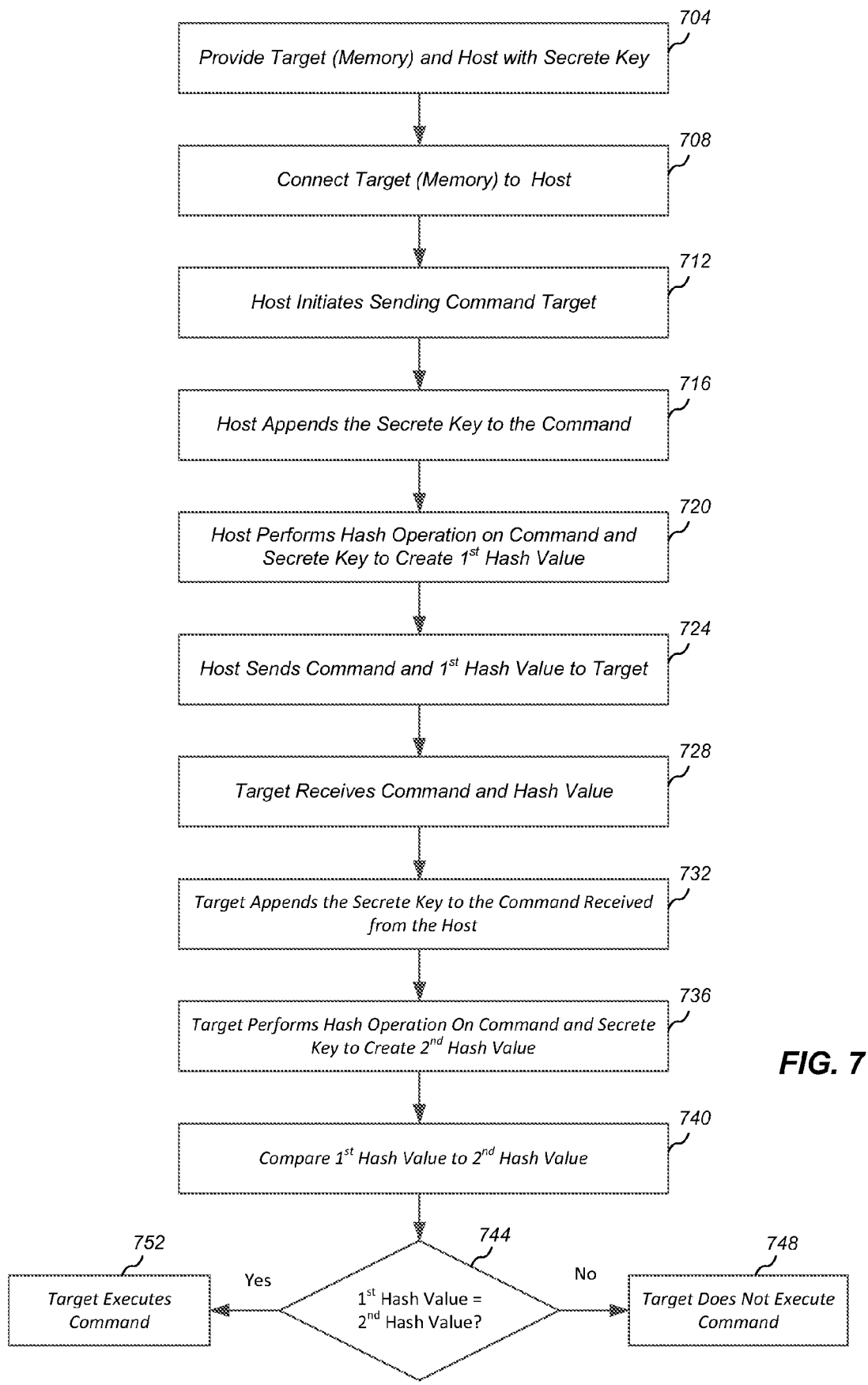
FIG. 7 illustrates an operation flow diagram of an exemplary authentication routine using a hash function.

FIG. 7 illustrates an operation flow diagram of an exemplary authentication routine using a hash function. This is but one possible method of operation of the authentication process and as such it is contemplated that other methods of operation occur which are based on the hash function. In this embodiment, the operation starts at a step 704 such that a target and host are provided for use. In this discussion, the target comprises a media module, such as any device that has memory for use with a camera, recorder, or other device. In this discussion, the host comprises a device, such as a camera, recorder, reader, or any other device that is capable of reading or writing to memory of the media module (target).

At a step 708 the target is connected to the host. The connection may comprise any type of electrical, communication, or physical connection including wireless, or optical. Upon or at any time during the connection the host may initiate sending a command to the target. This occurs at a step 712. The host may determine if the command is one that requires authentication before the target will execute the command. It is contemplated that not every command will require authentication. The command may comprise any type request or directive, such as but not limited to read, write, erase, change status of a file, view activity log or any other action.

At a step 716 the host appends the secrete key to the command. This may comprise adding the secrete key data to the end or beginning of the command. At a step 720 the host performs a hash operation on the combined data element comprising the command and the secrete key to create a first hash value. This first hash value is the unique output resulting from the performance of the hash operation on the command appended with the secrete key.

At a step 724 the host sends the command and the first hash value to the target and as step 728 the target receives the command and first hash value. Upon receipt of the command, the target may determine if the command requires authentication. It is contemplated that not all commands will require authentication.

At a step 732 the target appends its secrete key, which it has stored in its own memory, to the command just received from the host. This creates the same data structure as was hashed by the host, if the secrete keys are the same. If the secrete keys of the target and host are the same, then the combined data structure of the command and the secrete key will be the same whether created by the host or target.

At a step 736 the target performs the hash operation on the received command which has the appended secrete key that was stored in the target. As a result of this hash operation a second hash value is created. Then, at a step 740, the operation compares the first hash value to the second hash value. It is contemplated that if the two commands with appended secrete keys are the same, then the host's secrete key is the same as the target's secrete key and thus the hash values will match and the host and target are intended to be compatible.

At decision step 744 the operation determines if the first hash value matches or is the same as the second hash value. If the two hash values are the same, then the operation advances to a step 752 and the target executes the command. The command is executed because the hash values match and thus the host has authenticated. A match between the hash values indicates that the secrete keys in the host and target are the same and hence these devices are compatible. Alternatively, if at step 744 the first hash value does not match the second hash value the operation advances to step 748 and the target does not execute the command because the host and target are not compatible or the required level of authorization is not provided or possessed.

Figure 8:
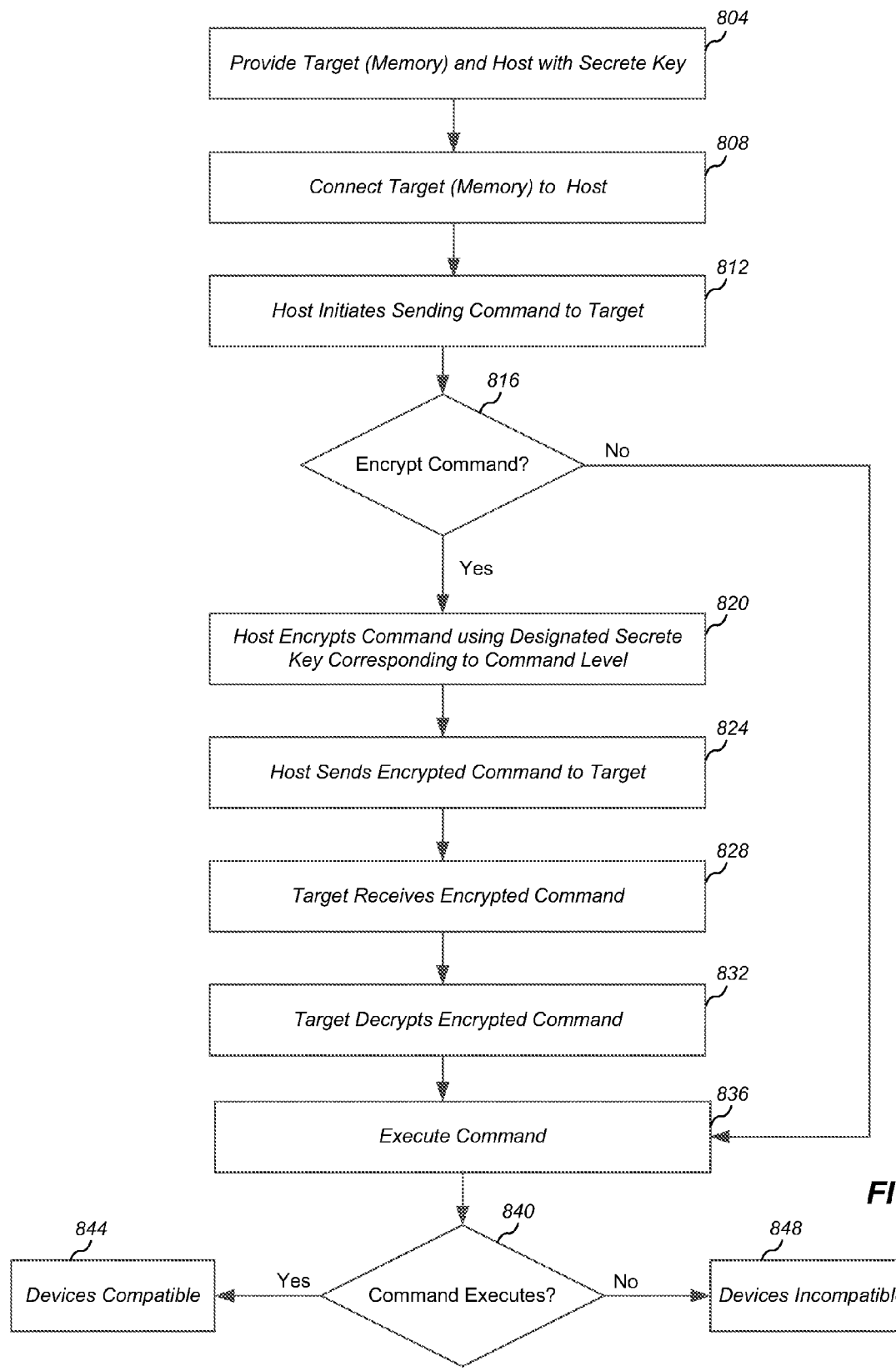
FIG. 8 illustrates an operation flow diagram of an exemplary authentication routine using a symmetric key function.

FIG. 8 illustrates an operation flow diagram of an exemplary authentication routine using a symmetric key function. This is but one possible method of operation of the authentication process and as such it is contemplated that other methods of operation may occur. In this embodiment, the operation starts at a step 804 where there is provided both a target, such a media module with memory, and a host, such as for example a camera. Both of the target and host are equipped with a secrete key. It is contemplated that if these secrete keys match, then the host and target are compatible or that the command sent from the host may be executed by the target. This process determines if these secrete keys match.

At a step 808, the target connects to the host. This connection may be physical, to establish an electrical connection, or wireless or optical. At a step 812 the host initiates sending a command to the target.

As in the last embodiment, it is contemplated that not all commands will need to be authenticated or encrypted. At decision step 816 the system determines if the command is to be encrypted. If not, the operation advances to step 836, which is discussed below.

Alternatively, if at decision step 816 the command does require encryption, then the operation advances to step 820. At step 820 the host encrypts the command using a designated secrete key that corresponds to the command level. Hence, different keys may be used for different levels or types of commands. A first key may be for a write operation while a second key may be for an erase operation. At a step 824 the host sends the encrypted command to the target.

At a step 828 the target receives the encrypted command for processing and evaluation. Then at step 832 the target tries a number of keys to decrypt the command from the host. A level of access is determined based on which key(s) were successfully able to decrypt the command. For example, if the target successfully decrypted a command using a level 1 key but the command requires a level 3 encryption, the target will not execute that command. When the target successfully decrypts a level n command with a level n key, it knows that the host possesses the level n key and hence has an access privilege compatible with access level n. The term n is defined as any whole number and is the number of levels of encryption or security configured in the target and host.

If the command is decrypted, then, the target attempts to execute the decrypted command. This occurs at a step 836. If the command was properly decrypted, it is contemplated that it will execute, but if the decryption failed, it will not execute. Thus, at a decision step 840 the operation determines if the command executes. If not, the operation advances to step 848 and the device or command is deemed incompatible or not authorized. Alternatively, if the command does execute, operation advances to step 844 and the device or command is deemed compatible.

Figure 9:
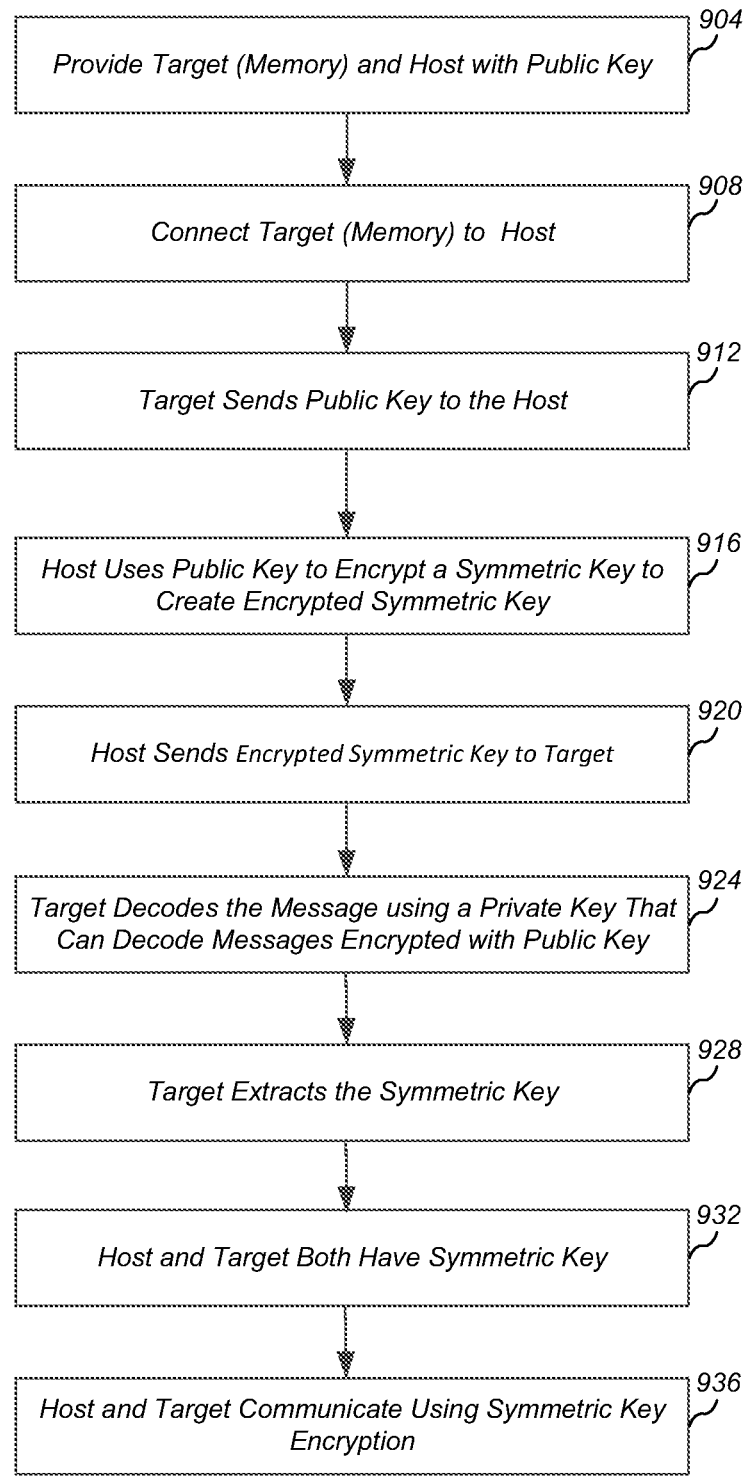
FIG. 9 illustrates an operation flow diagram of an exemplary authentication routine using an asymmetric key function.

FIG. 9 illustrates an operation flow diagram of an exemplary authentication routine using an asymmetric key function. This is but one possible method of operation using the asymmetric key function and it is contemplated that one of ordinary skill in the art may arrive at other possible methods. The asymmetric key operation uses a secure form of encryption to selectively enable communication between the host and the target. Symmetric cryptography uses the same secret (private) key to encrypt and decrypt its data whereas asymmetric uses both a public and private key. Symmetric key requires that the secret key be known by the party encrypting the data and the party decrypting the data. Asymmetric allows for distribution of your public key to any entity or device to encrypt the data to be sent securely and then the data can only be decoded by a device having the private key. Stated another way, the asymmetric key exchange allows the host to send the symmetric keys it supports to the target in a secure manner. As a result, the target side receives with confidence an encrypted message because it receives the keys directly from the host to which it is connected.

This embodiment begins at a step 904 with a public key being provided to a target (memory) and a host. This may occur at the time of manufacture or configuration, or at a later time. Then, at a step 908 the target connects to the host. This may comprise a physical connection to enable an electrical connection or the connection may comprise a wireless connection. The connection enables the host and target to communicate.

At a step 912, the target sends the public key to the host. It is contemplated that both the target and host have the public key. At a step 916 the host uses the public key to encrypt a symmetric key to create an encrypted symmetric key. The symmetric key is a key that, in practice, represent a shared secret key or code between two or more elements that can be used to maintain a private communication link.

Then, at a step 920 the host sends the encrypted symmetric key to a target. Because this key is encrypted, it is maintained as secret or confidential. At a step 924 the target decodes the message just received from the host using a private key that can decode messages encrypted with a public key. In one configuration the private key is stored at the factory using a protected process. This may be the case for all secrete keys stored in either the host or the target for all authentication operations.

From the decoding of the message using the private key, the target extracts the symmetric key. This occurs at a step 928. Thus, by a step 932 the host and target both have symmetric keys. These symmetric keys are derived by these two devices and exchanged by these devices and thereby establish means for secure communication between the devices. Thereafter, at a step 936, the host and the target communicate using symmetric key encryption.

From this method it is contemplated that if the host and target do not have matching public keys or the private key used by the target at step 924 is not the correct private key, then the exchange and decryption of the communication was not successful. This provides a mechanism to control compatibility between host (camera, reader) and the target (media module). In addition, the host and target may be configured with multiple public keys or private keys that are tailored to be used only with certain functions. Depending on whether these keys match, the functions may thus be enabled or disabled.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A data storage media compatibility system comprising:
   a storage media configured to store digital data;
   an enclosure configured to contain the storage media, the enclosure comprising one or more guides, the one or more guides configured to align with one or more corresponding pins on a video data source;
   a storage media controller configured to receive commands from the video data source and process the commands which control access to the storage media; and
   an authentication module configured to authenticate at least one of the commands, and responsive to authentication, allow or prevent execution of the at least one command.

2. The system of claim 1 wherein the storage media controller comprises a field programmable gate array.

3. The system of claim 1 wherein access to the storage media comprises reading, writing, or erasing video data stored or to be stored on the storage media.

4. The system of claim 1 wherein a command comprises an instruction from the video data source for the storage media to interface with the video data source.

5. The system of claim 1 where the authentication module comprises:
   a memory storing machine readable code configured to authenticate a command;
   processor configured to execute the machine readable code stored on the memory; and
   an input/output controller configured to control input to and output from the authentication module.

6. The system of claim 1 wherein authenticate at least one of the commands comprises performing one of the following authentication operations selected from the group of authentication operations consisting of: hash operation, symmetric key operation, and asymmetric key operation.

7. A media module having an authentication system for determining compatibility with a camera comprising:
   an enclosure having an electrical connector;
   one or more media guides on an outer surface of the enclosure, the one or more media guides configured to align the electrical connector with at least one camera connector to enable communication between the media module and the camera;
   an authentication system configured to determine compatibility between the media module and the camera before executing a command from the camera.

8. The module of claim 7 wherein the enclosure further comprises one or more locking guides configured to secure the media module to the camera.

9. The module of claim 7 wherein the authentication system comprises machine readable code stored on the media module the machine readable code executable by a processor of the media module to perform an authentication routine.

10. The module of claim 7 wherein the authentication system comprises an input/output controller, a processor, and memory, the memory configured to store machine readable code that is executable by the processor and configured to determine compatibility between the media module and the camera prior to the media module executing commands from the camera.

11. The module of claim 7 wherein the authentication module is configured to perform one or more of the following operations: hash operation authentication, symmetric key authentication, or asymmetric key authentication.

12. A method for determining compatibility between a media module and a video camera comprising:
    connecting the media module to a camera by aligning the media module with a camera connector and twisting to secure the media module and establish an electrical connection between the media module and the camera;
    generating a command at the camera;
    appending a first key to the command;
    performing a hash operation on the command with appended first key to create a first hash value;
    sending the command and the first hash value to the media module;
    receiving the command and first hash value at the media module and appending the second key to the command;
    performing a hash operation on the command with the appended second key to create a second hash value; and
    comparing the first hash value to the second hash value, and responsive to a match between the first hash value and the second hash value, executing the command at the media module.

13. The method of claim 12 wherein the command comprises a write to memory command.

14. The method of claim 12 wherein if the first hash value does not match the second hash value the media module does not execute the command.

15. The method of claim 12 wherein if the first hash value matches the second hash value the media module is compatible with the camera at a first level thereby allowing the media module to execute first level commands.

16. The method of claim 15 further comprising performing the method using a third key and a fourth key for a second level command.

17. A method for controlling compatibility between a media module and a video camera comprising:
    connecting the media module to a video camera;

exchanging a command or compatibility request between the media module and the video camera;

processing the command or compatibility request using an authentication routine to determine compatibility between the media module and the video camera;

enabling data communication between the media module and the video camera if the authentication routine determines compatibility.

18. The method of claim 17 wherein the authentication routine is executed by an authentication module within the media module.

19. The method of claim 17 further comprising exchanging a second level command or second level compatibility request between the media module and the video camera;

processing the second level command or second level compatibility request using an authentication routine to determine compatibility between the media module and the video camera for the second level command or second level compatibility request;

enabling data communication between the media module and the video camera if the authentication routine determines compatibility.

* * * * *